US010801401B2

(12) United States Patent
Mueller

(10) Patent No.: US 10,801,401 B2
(45) Date of Patent: Oct. 13, 2020

(54) TOROIDAL ENGINE

(71) Applicant: Kevin M. Mueller, Rockton, IL (US)

(72) Inventor: Kevin M. Mueller, Rockton, IL (US)

(73) Assignee: Constant Velocity Design LLC, Rockton, IL (US)

( * ) Notice: Subject to any disclaimer, the term of this patent is extended or adjusted under 35 U.S.C. 154(b) by 78 days.

(21) Appl. No.: 16/155,640

(22) Filed: Oct. 9, 2018

(65) Prior Publication Data
US 2019/0112974 A1    Apr. 18, 2019

Related U.S. Application Data

(60) Provisional application No. 62/571,675, filed on Oct. 12, 2017.

(51) Int. Cl.
| F01C 3/02 | (2006.01) |
| F01C 11/00 | (2006.01) |
| F01C 17/02 | (2006.01) |
| F01C 21/00 | (2006.01) |
| F02B 53/08 | (2006.01) |
| F02B 53/10 | (2006.01) |
| F02B 53/14 | (2006.01) |

(52) U.S. Cl.
CPC ............... *F02B 53/14* (2013.01); *F01C 3/02* (2013.01); *F01C 3/025* (2013.01); *F01C 11/002* (2013.01); *F01C 11/004* (2013.01); *F02B 53/08* (2013.01); *F02B 53/10* (2013.01); *F01C 17/02* (2013.01); *F01C 21/008* (2013.01)

(58) Field of Classification Search
CPC .......... F01C 3/02; F01C 3/025; F01C 11/002; F01C 11/004; F01C 17/02; F01C 21/008
See application file for complete search history.

(56) References Cited

U.S. PATENT DOCUMENTS

| 679,392 A | 7/1901 | McKenzie |
| 760,631 A | 5/1904 | Jewell |
| 822,952 A | 6/1906 | Jewell |
| 1,618,360 A | 2/1927 | Wellman, Jr. |
| 2,674,982 A | 4/1954 | McCall |
| 3,060,910 A | 10/1962 | McCall |
| 3,208,437 A | 9/1965 | Coulter |
| 3,502,054 A | 3/1970 | Hambric |
| 3,523,003 A | 8/1970 | Hambric |

(Continued)

FOREIGN PATENT DOCUMENTS

| EP | 0 933 500 A1 | 8/1999 |
| EP | 2 808 484 A1 | 12/2014 |

OTHER PUBLICATIONS

RCV Engines Limited; "Technology: Rotating Cylinder Valve"; internet printout; date last visited Nov. 10, 2015; 1 page; http://www.rcvengines.com/technology_rotatingcylindervalve.html.

*Primary Examiner* — Audrey K Bradley
(74) *Attorney, Agent, or Firm* — Reinhart Boerner Van Deuren P.C.

(57) ABSTRACT

A toroidal combustion engine is provided. The toroidal combustion engine includes a first and a second toroidal cylinder which share a single common intersection to define a combustion chamber. The first toroidal cylinder carries a first piston set, while the second toroidal cylinder carries a second piston set. The first and second piston sets are each rotatable about circular paths which are disposed in planes that are perpendicular to one another.

26 Claims, 22 Drawing Sheets

(56) References Cited

U.S. PATENT DOCUMENTS

| | | | |
|---|---|---|---|
| 3,751,193 A | | 8/1973 | McCall |
| 5,199,391 A | * | 4/1993 | Kovalenko ............. F01C 1/073 123/43 B |
| 6,546,908 B1 | | 4/2003 | Pekau |
| 6,880,494 B2 | | 4/2005 | Hoose |
| 7,621,254 B2 | | 11/2009 | Rahon |
| 7,721,687 B1 | | 5/2010 | Lockshaw et al. |
| 8,136,503 B2 | | 3/2012 | Althen |
| 8,161,924 B1 | | 4/2012 | Lockshaw et al. |
| 9,695,741 B2 | | 7/2017 | Mueller |
| 2012/0067324 A1 | | 3/2012 | Williams |
| 2014/0294646 A1 | | 10/2014 | Murphy et al. |

* cited by examiner

TOROIDAL ENGINE

CROSS-REFERENCE TO RELATED PATENT APPLICATION

This patent application claims the benefit of U.S. Provisional Patent Application No. 62/571,675, filed Oct. 12, 2017, the entire teachings and disclosure of which are incorporated herein by reference thereto.

FIELD OF THE INVENTION

This invention generally relates to combustion engines, and more specifically to toroidal combustion engines.

BACKGROUND OF THE INVENTION

In terms of internal combustion engines, the typical reciprocating piston engine is a well-known expedient. However, this type of engine is plagued by some very well-known design flaws. Such flaws include for example a variable leverage or torque introduced by the crank shaft during reciprocation, as well as the wasted energy and increased stresses and wear inherent to reciprocation in the first place, which serve to limit the engines overall performance.

Inspired by the promise of the toroidal cylinder, a number of toroidal engines (i.e. engines which have a toroidal cylinder within which a piston travels to achieve combustion) have been proposed. Generally, the existing toroidal engines can be broken down into two basic designs, single rotor and dual rotor. In either case, each rotor is comprised of one or more pistons. Examples of each design philosophy tend to share some of the same basic design problems.

Single rotor designs involve some type of valve mechanism utilized to compartmentalize the torus cylinder into variable volume combustion chambers. These valves are inherently complex, clearly unreliable and are difficult to seal. Such complexity leads to increased cost in design, as well as increased cost in maintenance, making the same generally undesirable.

Dual rotor designs were conceived to avoid the above mentioned problematic valve of single rotor designs and instead use two or more pistons to once again compartmentalize the torus cylinder. In these designs the pistons either reciprocate or at the very least oscillate (varying their relative speed as they progress around the cylinder circumference). Unfortunately these designs require either a ratchet mechanism, cam, special gearing or other means of varying their motion which again adds to the complexity of the timing mechanism inevitably condemning the design to stress, vibration, wear and mechanical speed limitations.

Despite the above drawbacks of existing toroidal engines, there have been recent attempts to address the same. For example, U.S. Pat. No. 8,136,503 to Althen titled, "Piston Valve Internal Combustion Engine" the teachings and disclosure of which are incorporated by reference herein in their entirety proposes two matched torus cylinders which cross through one another at two points, each 180 degrees of rotation from the first, thus both torus cylinders are intersected twice. In this engine, each cylinder handles all four cycles of combustion using a single counter balanced piston and a separate, less than optimal combustion chamber. Also in this engine, a complication in the gearing is introduced which links the two rotors together. As a result, one of the rotors or pistons in this design oscillates relative to the other, once more introducing complexity, stress, mechanical speed limitations and wear to the system.

As another example, U.S. Pat. No. 7,621,254 to Rahon titled, "Internal Combustion Engine with Toroidal Cylinders" the teachings and disclosure of which are incorporated by reference herein in their entirety proposes an engine with three torus cylinders, aligned in a row and intersecting at right angles similar to links in a chain. The Applicant has found with such a configuration, as the pistons rotate their face angles unpredictably change in an uncontrolled manner rendering the design unworkable.

In view of the above drawbacks with existing designs, there is a need in the art for a toroidal engine which advantageously provides efficient combustion and sufficient power output without being overly complex and costly. The invention provides such a toroidal engine. These and other advantages of the invention, as well as additional inventive features, will be apparent from the description of the invention provided herein.

BRIEF SUMMARY OF THE INVENTION

In one aspect, the invention presents a toroidal combustion engine. An embodiment according to this aspect includes a first toroidal cylinder housing a first piston set. The first piston set is rotatable within the first toroidal cylinder. The toroidal combustion engine also includes a second toroidal cylinder housing a second piston set. The second piston set is rotatable within the second toroidal cylinder. A drive train connects the first piston set to the second piston set such that rotation of the first piston set results in rotation of the second piston set. The drive train also includes an output shaft for providing a power output from the toroidal combustion engine. The first and second toroidal cylinders intersect at a single intersection to define a combustion chamber of the toroidal engine.

In certain embodiments, the first circular path has a first radius and the second circular path has a second radius. The first radius is greater than the second radius. The first piston set includes a first plurality of pistons and the second piston set includes a second plurality of pistons. The first plurality of pistons is greater in number than the second plurality of pistons. A ratio of the first radius to the second radius is equal to a ratio of a total number of the first plurality of pistons to a total number of the second plurality of pistons. In certain embodiments, the second plurality of pistons may be commonly mounted to a drive disc that has two matable disc halves.

In certain embodiments, an intake port and first exhaust port are in fluid communication with the combustion chamber. A throttle body is in communication with the intake port to control the flow of intake air through the intake port. One of a spark plug or a glow plug, and a fuel injector are also each in communication with the combustion chamber. A second exhaust port is in fluid communication with the first toroidal cylinder.

In certain embodiments, the first plurality of pistons is rotatable about a first circular path lying in a first plane, and the second plurality of pistons is rotatable about a second circular path lying in a second plane perpendicular to the first plane. Each one of the first plurality of pistons includes a leading face and a trailing face. The leading face and the trailing face of each one of the first plurality of pistons intersects the first plane at a forty-five degree angle. Each one of the second plurality of pistons includes a leading face and a trailing face. The leading face and the trailing face of each one of the second plurality of pistons intersects the second plane at a forty-five degree angle. A center of the first circular path and a center of the second circular path each lie within both the first plane and the second plane. In certain embodiments, at least one of the leading face and the trailing face of at least one of the first plurality of pistons or the second plurality of pistons includes a textured surface.

In certain embodiments, a first pair of seal rings seal the first piston set within the first toroidal cylinder and a second pair of seal rings seal the second piston set within the second toroidal cylinder.

In certain embodiments, a lubrication arrangement for conveying lubrication to one or more lubrication points of the toroidal engine is also provided. The lubrication arrangement includes an oil pan, an oil pump for circulating oil from the oil pan and back to the oil pan, and an oil filter for filtering oil circulating in said lubrication arrangement. The drive train also includes a drive cage connecting the first piston set to the output shaft of the drive train such that rotation of the first piston set results in rotation of the output shaft. The output shaft is connected to a drive shaft of the drive train such that rotation of the output shaft results in rotation of the drive shaft. The drive shaft is connected to a second piston set such that rotation of the drive shaft results in rotation of the second piston set. An accessory shaft is connected to the output shaft. The oil pump is connected to the accessory shaft such that rotation of the output shaft results in rotation of the accessory shaft to drive the oil pump. A starter may also be connected to the drive shaft for providing an input torque to the drive shaft.

In another aspect, a toroidal combustion engine is provided. An embodiment of a toroidal combustion engine according to this aspect includes a first toroidal cylinder housing a first piston set. The first piston set is rotatable about a first circular path. The first circular path lies within a first plane. The toroidal combustion engine also includes a second toroidal cylinder housing a second piston set. The second piston set is rotatable about a second circular path. The second circular path lies within a second plane. The first and second planes are arranged such that they are perpendicular to one another. A combustion chamber is defined between the first toroidal cylinder and the second toroidal cylinder. A drive train connects the first piston set to the second piston set such that rotation of the first piston set results in rotation of the second piston set. A center of the first circular path and a center of the second circular path each lie within both the first plane and the second plane.

In certain embodiments, the first toroidal cylinder and second toroidal cylinder are formed via connection of first and second upper cylinder bodies and first and second lower cylinder bodies. The first piston set includes a first plurality of pistons. The first plurality of pistons is commonly connected to a drive ring. The drive ring includes an outwardly projecting flange. A first pair of seal rings are arranged between the first and second upper cylinder bodies and the first and second lower cylinder bodies such that one of the first pair of seal rings is interposed between the first upper body and the first lower body and a first side of the flange. The other one of the first pair of seal rings is interposed between the second upper body and the second lower body and a second side of the flange.

In certain embodiments, the second piston set includes a second plurality of pistons. The second plurality of pistons is commonly connected to a drive disc. A second pair of seal rings are arranged between the first and second upper cylinder bodies and the first and second lower cylinder bodies such that one of the second pair of seal rings is interposed between the first upper body and the second upper body and a first side of the drive disc. The other one of the second pair of seal rings is interposed between the first lower body and the second lower body and a second side of the drive disc. In certain embodiments, the drive disc may include two matable disc halves.

In certain embodiments, the first circular path has a first radius and wherein the second circular path has a second radius. The first radius is greater than the second radius. The first piston set includes a first plurality of pistons and the second piston set includes a second plurality of pistons. The first plurality of pistons is greater in number than the second plurality of pistons. In certain embodiments, a ratio of the first radius to the second radius is equal to a ratio of a total number of the first plurality of pistons to a total number of the second plurality of pistons.

In certain embodiments, the first and second toroidal cylinders have a single intersection which defines the combustion chamber. An intake port and first exhaust port are in fluid communication with the combustion chamber. A throttle body is in communication with the intake port to control the flow of intake air through the intake port. One of a spark plug or a glow plug, and a fuel injector are also provided, each in communication with the combustion chamber. A second exhaust port is in fluid communication with the first toroidal cylinder. The first and second exhaust ports are opened and closed in an alternating configuration by the first piston set such that when the first exhaust port is open, the second exhaust port is closed and when the second exhaust port is open the first exhaust port is closed. This alternating configuration makes the system ideal for driving a turbocharger given that either the first or the second exhaust port is always pressurized.

In certain embodiments, the first plurality of pistons is rotatable about a first circular path lying in a first plane. The second plurality of pistons is rotatable about a second circular path lying in a second plane perpendicular to the first plane. Each one of the first plurality of pistons includes a leading face and a trailing face, wherein the leading face and the trailing face of each one of the first plurality of pistons intersects the first plane at a forty-five degree angle. Each one of the second plurality of pistons includes a leading face and a trailing face, wherein the leading face and the trailing face of each one of the second plurality of pistons intersects the second plane at a forty-five degree angle. In certain embodiments, at least one of the leading face and the trailing face of at least one of the first plurality of pistons or the second plurality of pistons includes a textured surface.

In certain embodiments, a lubrication arrangement for conveying lubrication to one or more lubrication points of the toroidal engine is also provided. The lubrication arrangement including an oil pan, an oil pump for circulating oil from the oil pan and back to the oil pan, and an oil filter for filtering oil circulating in said lubrication arrangement.

In certain embodiments, the drive train includes a drive cage that connects the first piston set to an output shaft of the drive train such that rotation of the first piston set results in rotation of the output shaft. The output shaft connects to a drive shaft of the drive train such that rotation of the output shaft results in rotation of the drive shaft. The drive shaft is connected to second piston set such that rotation of the drive shaft results in rotation of the second piston set. An accessory shaft is connected to the output shaft. The oil pump is connected to the accessory shaft such that rotation of the output shaft results in rotation of the accessory shaft to drive the oil pump. A starter may also be connected to the drive shaft for providing an input torque to the drive shaft.

In yet another aspect, a toroidal combustion engine is provided. An embodiment of a toroidal engine according to this aspect includes a first toroidal cylinder housing a first piston set. The first piston set is rotatable within said first toroidal cylinder. The toroidal engine also includes a second toroidal cylinder housing a second piston set. The second piston set is rotatable within said second toroidal cylinder. A combustion chamber is defined by the first and second toroidal cylinders. A drive train connects the first piston set to the second piston set such that rotation of the first piston set results in rotation of the second piston set. The drive train includes a drive cage connecting the first piston set to an output shaft of the drive train such that rotation of the first piston set results in rotation of the output shaft. The output shaft is connected to a drive shaft of the drive train such that rotation of the output shaft results in rotation of the drive shaft, the drive is shaft connected to a second piston set such that rotation of the drive shaft results in rotation of the second piston set.

In certain embodiments, the first piston set is rotatable about a first circular path in a first plane. The second piston set is rotatable about a second circular path in a second plane. The first circular path has a first radius and wherein the second circular path has a second radius. The first radius is greater than the second radius. The first piston set includes a first plurality of pistons and the second piston set includes a second plurality of pistons. The first plurality of pistons is greater in number than the second plurality of pistons. A ratio of the first radius to the second radius is equal to a ratio of a total number of the first plurality of pistons to a total number of the second plurality of pistons. In certain embodiments, the second plurality of pistons may be commonly mounted to a drive disc that has two matable disc halves.

In certain embodiments, an intake port and first exhaust port are in fluid communication with the combustion chamber. In certain embodiments, the throttle body is in communication with the intake port to control the flow of intake air through the intake port. One of a spark plug or a glow plug, and a fuel injector are each in communication with the combustion chamber. A second exhaust port is in fluid communication with the first toroidal cylinder.

In certain embodiments, each one of the first plurality of pistons includes a leading face and a trailing face. The leading face and the trailing face of each one of the first plurality of pistons intersects the first plane at a forty-five degree angle. Each one of the second plurality of pistons includes a leading face and a trailing face. The leading face and the trailing face of each one of the second plurality of pistons intersects the second plane at a forty-five degree angle. A center of the first circular path and a center of the second circular path each lie within both the first plane and the second plane.

In certain embodiments, a first pair of seal rings seals the first piston set within the first toroidal cylinder and a second pair of seal rings seal the second piston set within the second toroidal cylinder.

In certain embodiments, a lubrication arrangement is also provided for conveying lubrication to one or more lubrication points of the toroidal engine. The lubrication arrangement includes an oil pan, an oil pump for circulating oil from the oil pan and back to the oil pan, and an oil filter for filtering oil circulating in said lubrication arrangement.

In certain embodiments, the drive train also includes an accessory shaft connected to the output shaft. The oil pump is connected to the accessory shaft such that rotation of the output shaft results in rotation of the accessory shaft to drive the oil pump. A starter may be connected to the drive shaft for providing an input torque to the drive shaft.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to FIGS. 1-20, an embodiment of a toroidal combustion engine (hereinafter referred to as engine 100) is illustrated. Engine 100 advantageously provides an efficient toroidal configuration which presents a small footprint. Further, Engine 100 advantageously utilizes two piston sets which constantly rotate relative to one another yet maintain fixed face angles relative to their respective circular paths. As will be explained in greater detail herein, engine 100 is a split cycle design which employs two sets of pistons respectively contained with first and second toroidal cylinders. One set of pistons is responsible for intake and compression, while the other set of pistons is responsible for power and exhaust. Unlike a conventional piston engine which utilizes a piston that compresses a charge against a wall of the cylinder containing the piston, engine 100 utilizes a novel configuration in which a piston of one of the sets compresses a charge against a piston of the other one of the sets, as these piston sets continuously rotate relative to one another.

Figure 1:
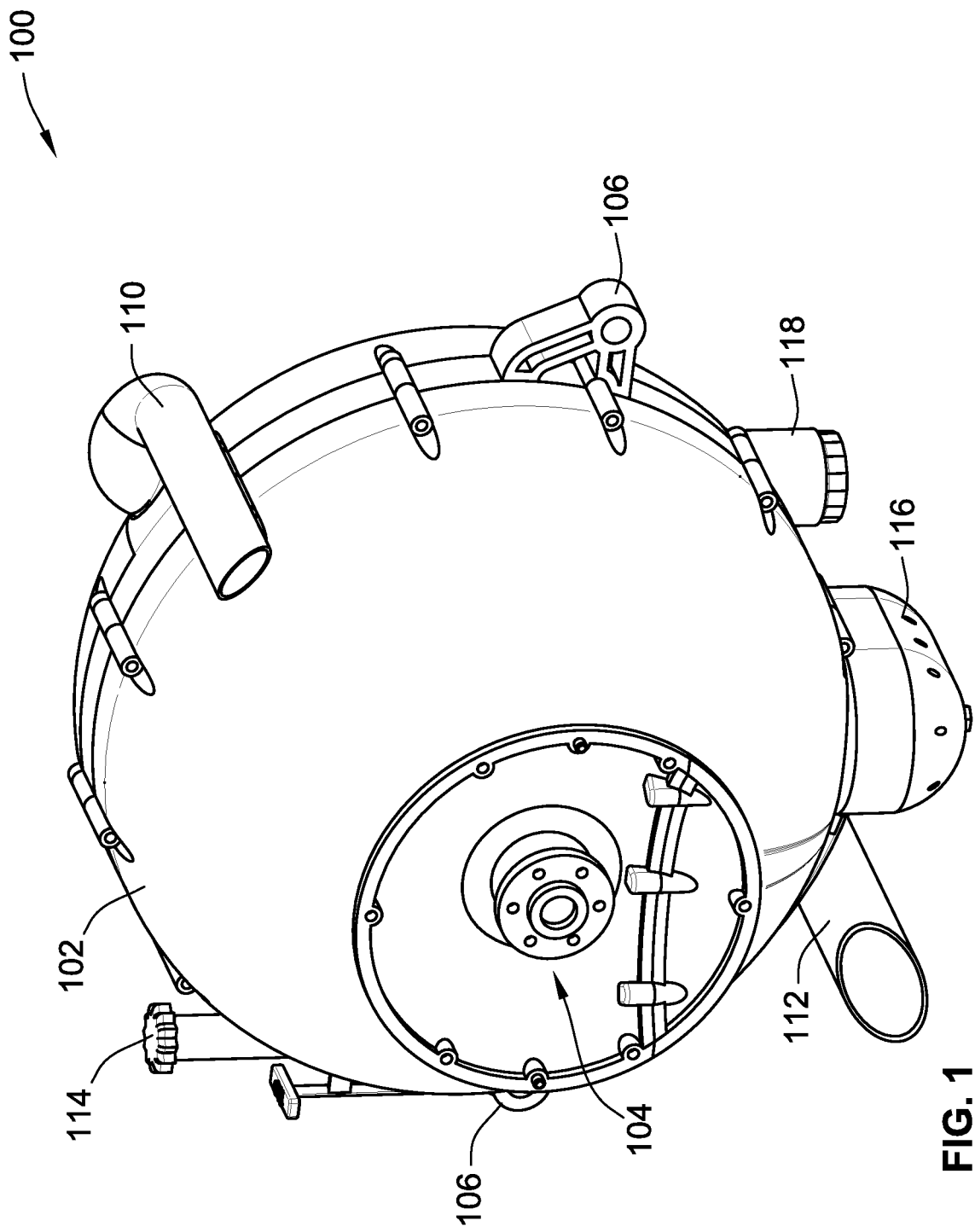
FIG. 1 is a perspective view of an embodiment of a toroidal engine according to the teachings herein.

With particular reference now to FIG. 1, the same illustrates engine 100 in a perspective view. As can be seen, engine 100 includes a generally spherical presentation given its packaging in a generally spherical housing 102. At its most basic level of functionality, engine 100 provides a power output at an output shaft 104. This output shaft 104 may directly couple a drive shaft or another component to impart a rotational torque thereto. As one non-limiting example, output shaft 104 may couple directly to a drive shaft of a vehicle. As another non-limiting example, output shaft 104 may couple to a transmission of a vehicle. Whatever the application, output shaft 104 provides a power output in the form of a rotational torque.

Engine 100 offers convenient motor mounts 106 for mounting engine 100 within an engine cavity or the like. Engine 100 is a combustion engine which can use any conventional combustible fuel known and used in such applications. As such, engine 100 includes exhaust conduits 110, 112, as well as an air intake 140 conduit (see FIG. 4) to achieve the typical intake and exhaust functionality of a combustion engine. Engine 100 also includes a lubrication arrangement which includes an oil pan 116, oil filter 118, an oil pump 126 (see FIG. 5) for circulating oil provided to engine 100 at oil pipe 114. This lubrication may be routed to various points in the engine, and may be utilized for bearing lubrication of the various components of the drive train described herein.

Figure 2:
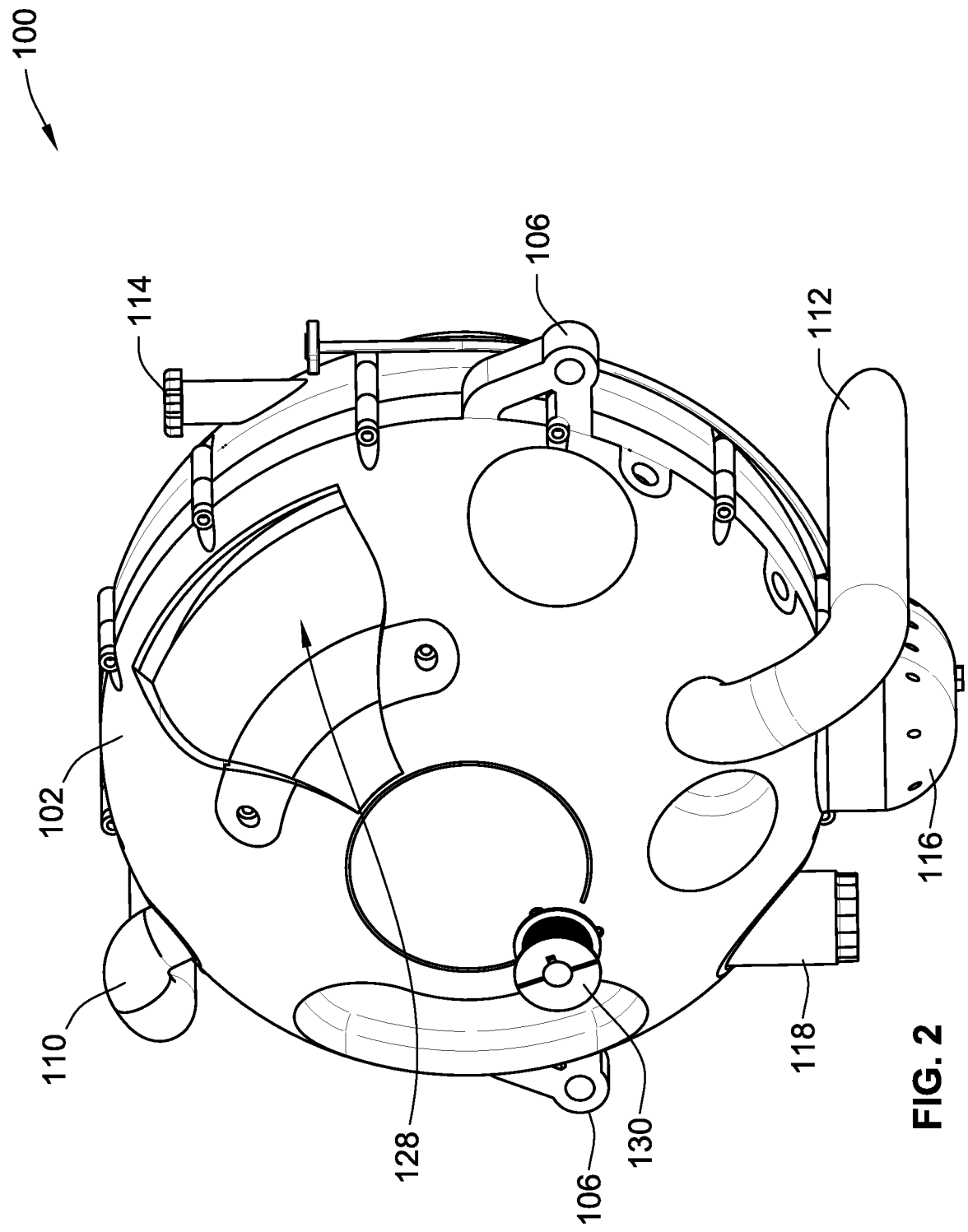
FIG. 2 is a perspective view of the toroidal engine of FIG. 1, showing a side opposite that shown in FIG. 1.

Turning now to FIG. 2, a side of engine 100 opposite that shown in FIG. 1 is illustrated. In this view, an air intake opening 128 which is responsible for taking in intake air and supplying the same via intake conduit 140 to engine 100 for combustion purposes. As can also be seen in this view, an accessory shaft of the below-described drive train of engine 100 extends out of housing 102, and has a pulley 130 mounted thereto. This pulley may be used to drive a belt that in turn drives any other componentry typically used in a motor vehicle, e.g. alternators, air conditioning units, or super chargers, water pumps, etc. As can also be seen in FIG. 2, housing 102 may also include various cavities for mounting other componentry such as a water jacket cooling device, etc.

Figure 3:
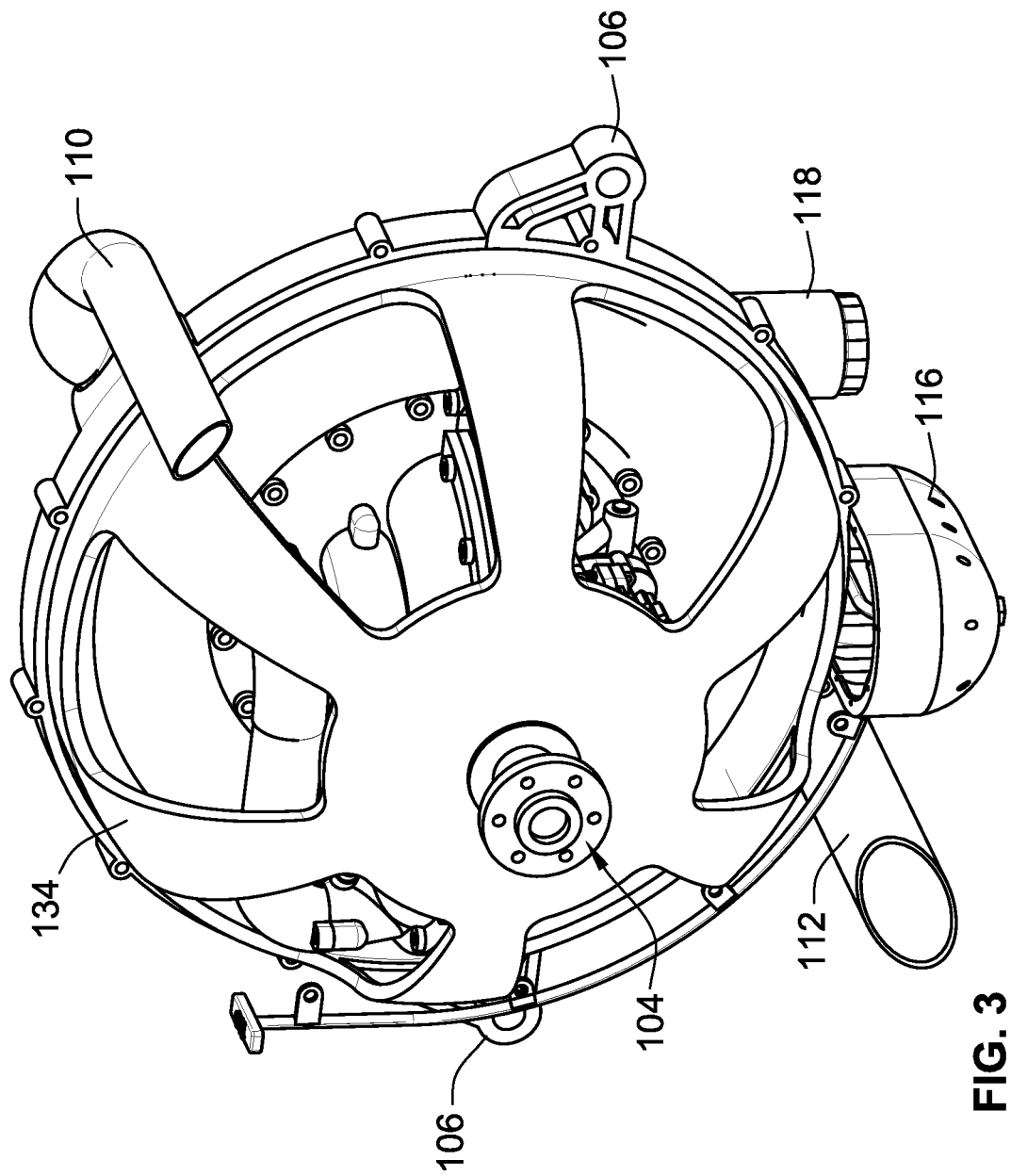
FIG. 3 is a perspective view of the toroidal engine of FIG. 1, with an outer covering removed to expose a drive cage of the toroidal engine.

With reference to FIG. 3, housing 102 has been removed to illustrate the internal componentry of engine 100. Of prominent illustration in FIG. 3 is drive cage 134. Drive cage 134 is coupled to output shaft 104. Drive cage 134 is in turn coupled to a first piston set 200 (see FIG. 6) of engine 100. This coupling may be achieved in any manner so long as rotation of output shaft 104 results in a like rotation of the above-introduced first piston set 200. As will be understood from the following, first piston set 200 (see FIG. 6) imparts a rotational torque to output shaft 104. This torque is not only utilized to provide the power output of engine 100, but also for purposes of driving a second piston set 210 (see FIG. 6), via a connection of first output shaft 104 to second piston set with a bevel gear set 224, 226 (see FIG. 7).

Figure 4:
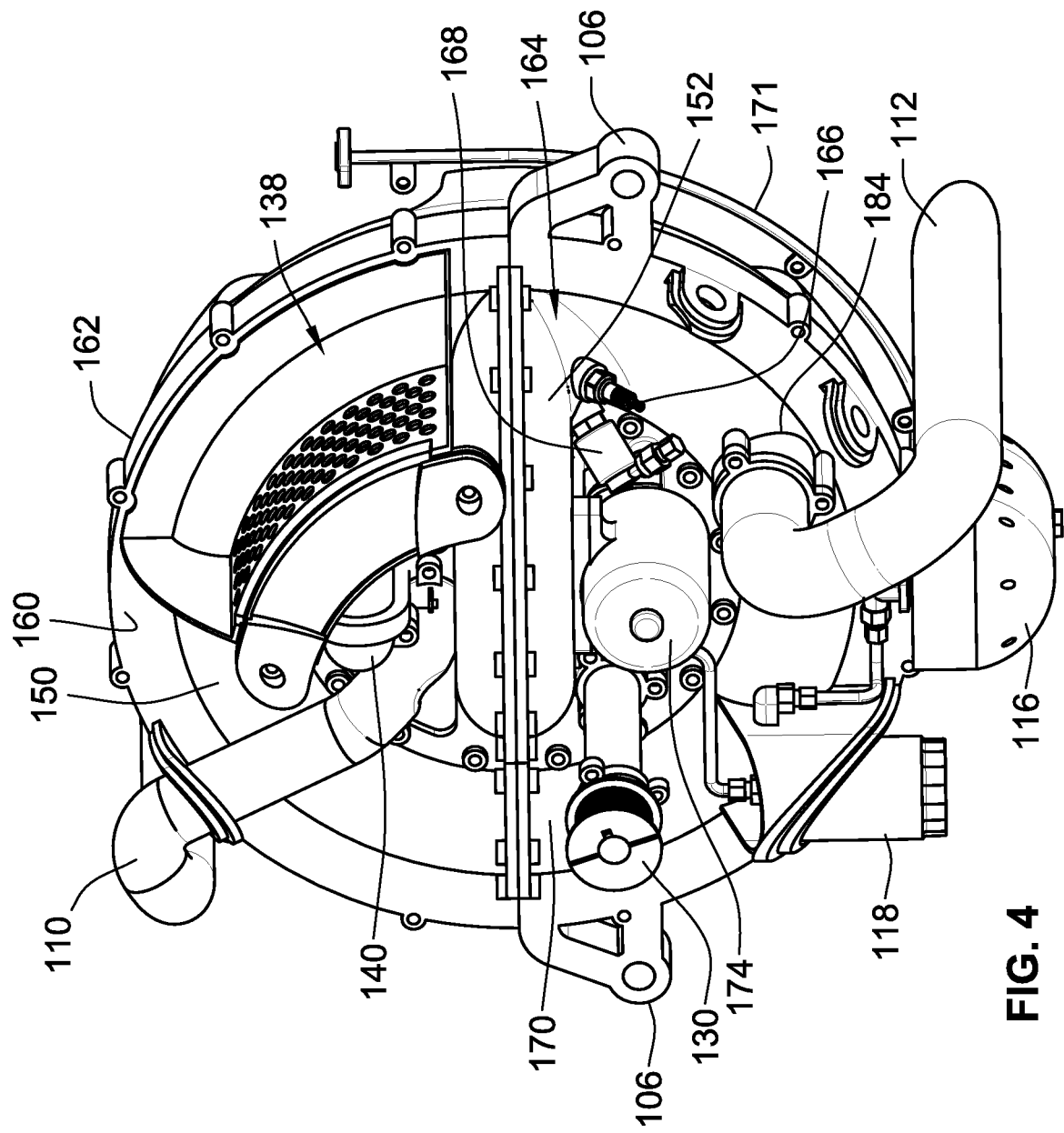
FIG. 4 is a perspective view of the toroidal engine of FIG. 1, with another outer covering removed to expose a side of the toroidal engine opposite that shown in FIG. 3.

With reference to FIG. 4, the same illustrates the side of engine 100 opposite that shown in FIG. 3, again with housing 102 removed to expose the internal componentry thereof. As can be seen in this view, an air intake region 138 is defined to which air intake conduit 140 connects. Air received at air intake opening 128 passes through air intake region 138 before entering air intake conduit. As such, an air filter may be carried at air intake region 138 for purposes of filtering intake air.

As briefly introduced above, engine 100 employs a first toroidal cylinder 150, and a second toroidal cylinder 152. As their names imply, these cylinders take on the shape of a torus. Each cylinder 150, 152 is hollow and respectively carries one of the aforementioned piston sets 200, 210 (see FIG. 6) introduced above.

In particular, first toroidal cylinder 150 carries first piston set 200, with first piston set 200 rotatable within the hollow interior of first toroidal cylinder 150. Second toroidal cylinder 152 carries second piston set 210, with second piston set 210 rotatable within the hollow interior of second toroidal cylinder 152.

The first and second toroidal cylinders 150, 152 are formed by joining four "quadrant" cylinder bodies together. These cylinder bodies are referred to herein as first and second upper cylinder bodies 160, 162, and first and second lower cylinder bodies 170, 172. These cylinder bodies 160, 162, 170, 172 each define a portion of the first and the second toroidal cylinders 150, 152 such that when they are assembled, the first and second toroidal cylinders 150, 152 are formed.

The hollow interiors of first and second toroidal cylinders 150, 152 share only a single intersection which defines a combustion chamber 164. This region of intersection may be "blistered" as shown such that it includes more volume than just the geometrical volume of the toroidal cylinder intersection. Additionally, a spark plug 166 and a fuel injector 168 are mounted to this blistered region and are in communication with the internal combustion chamber. The type of spark plug 166 and type of fuel injector 168 may take on any form and should thus be taken as a general descriptor of such components only. Further, it is also contemplated that engine 100 could employ diesel fuel instead of gasoline. In such an instance, the typical componentry associated with diesel combustion would be employed, e.g. glow plugs, etc. Further, although not shown, fuel introduction and ignition may be controlled by an engine control unit or the like.

Additionally shown in FIG. 4 is a starter 174 which may be utilized to provide an initial starting torque to the drive train described herein to begin the combustion cycle at startup. This starter 174 may be any known type of electric starter or mechanical starter and thus should be taken as exemplary only.

Figure 5:
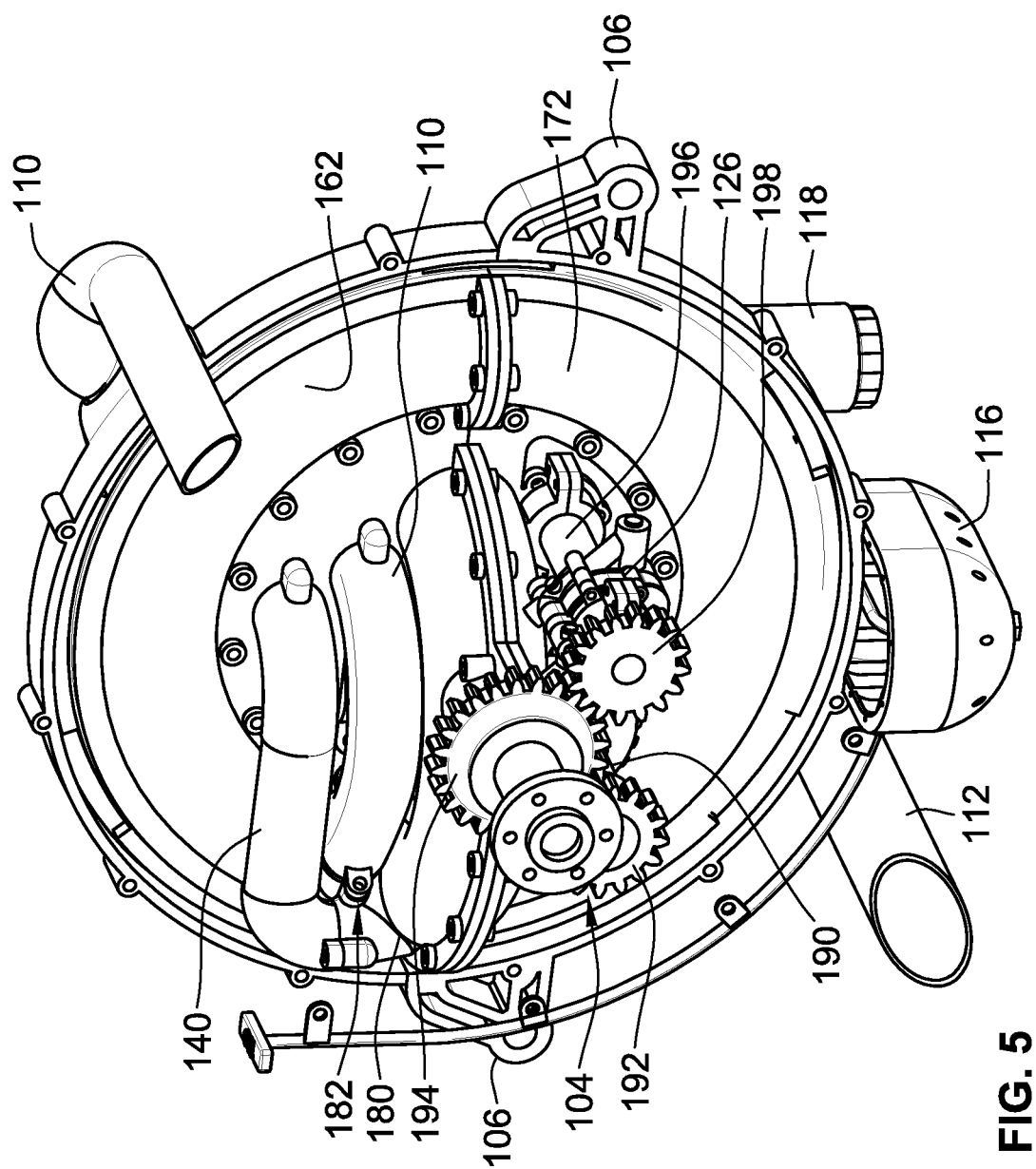
FIG. 5 is a perspective view of the toroidal engine of FIG. 1, with the drive cage shown in FIG. 3 removed to expose a drive train of the toroidal engine.

Turning now to FIG. 5, the same illustrates the same orientation of engine 100 as shown in FIG. 3, but with drive cage 134 removed from a remainder of the drive train of engine 100. As can be seen in this view, first exhaust conduit 110 terminates at a first exhaust port 182 which is in communication with combustion chamber 164, while air intake conduit 140 terminates at an intake port, which is also in communication with combustion chamber 164. Air intake conduit 140 may also include a throttle body for throttling the intake air. This throttle body may be a traditional mechanically cable controlled system, or a contemporary electronically controlled throttle which in the latter would also be controlled by an engine control unit. Referring momentarily back to FIG. 4, second exhaust conduit 112 terminates at a second exhaust port 184. This dual exhaust port configuration provides for an efficient scavenging of exhaust gases formed during combustion as described below.

Referring back to FIG. 5, the aforementioned drive train includes the above introduced drive cage 134 and output shaft 104, as well as a drive shaft 190. Drive shaft 190 is coupled via drive gear 192 to an output gear 194 mounted to output shaft 104. The drive train also includes an accessory shaft 196 coupled via an accessory gear 198 to drive gear 194. Rotation of output shaft 104 thus results in rotation of drive shaft 190 and accessory shaft 196.

It will also be noted that the above introduced oil pump 126 is connected to and directly driven by accessory shaft 196. It is also entirely conceivable to couple oil pump 126 elsewhere within drive train to drive the same. As discussed above, oil pump 126 may convey lubrication to various points of engine 100. For example, lubrication may be provided from oil pump 126 to any bearing supporting any of the rotational shafts of the drive train. Further, lubrication provided from oil pump 126 may be utilized between each piston set 200, 210 (see FIG. 6) and their associated cylinder 150, 152. This conveyance of lubricating oil by oil pump 126 may be achieved using appropriate conduit(s) from oil pump 126 to these various lubrication sites.

Figure 7:
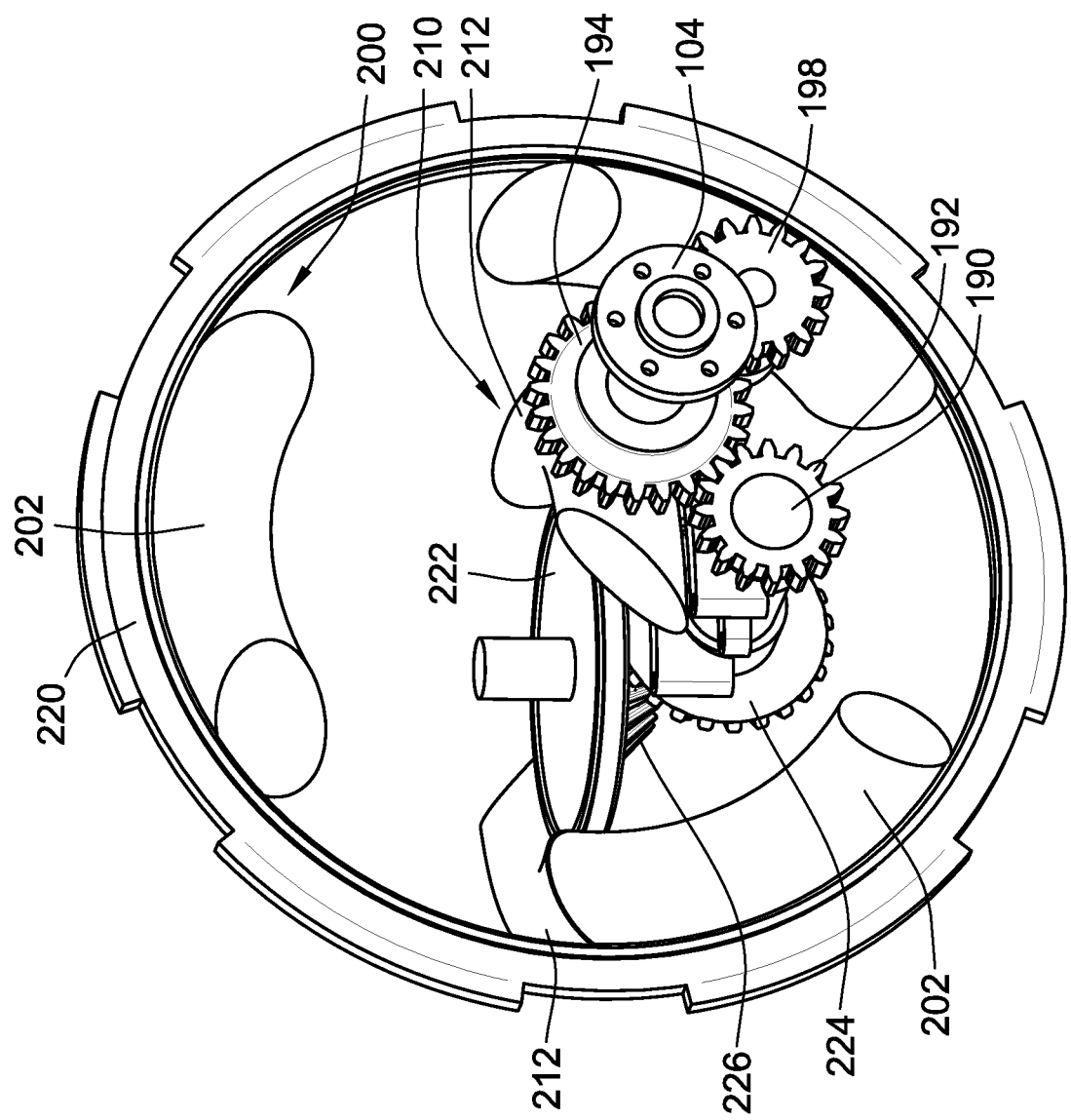
FIG. 7 is a perspective view of the first and second piston sets and the drive train.

Drive gear 190 is coupled to a bevel gear set 224, 226 of the drive train as may be seen with momentary reference to FIG. 7. Bevel gear 224 is coupled directly to drive shaft 190, while bevel gear 226 is coupled directly to the second piston set 210 as described below. Output gear 194, drive gear 192, and bevel gears 224, 226 thus make up a timing gear set responsible for maintaining the timing of the rotation of the first and second piston sets 200, 210. It will be recognized, however, that a different number of gears could be utilized for timing, as well as the use of other structures such as timing chains or the like.

Figure 6:
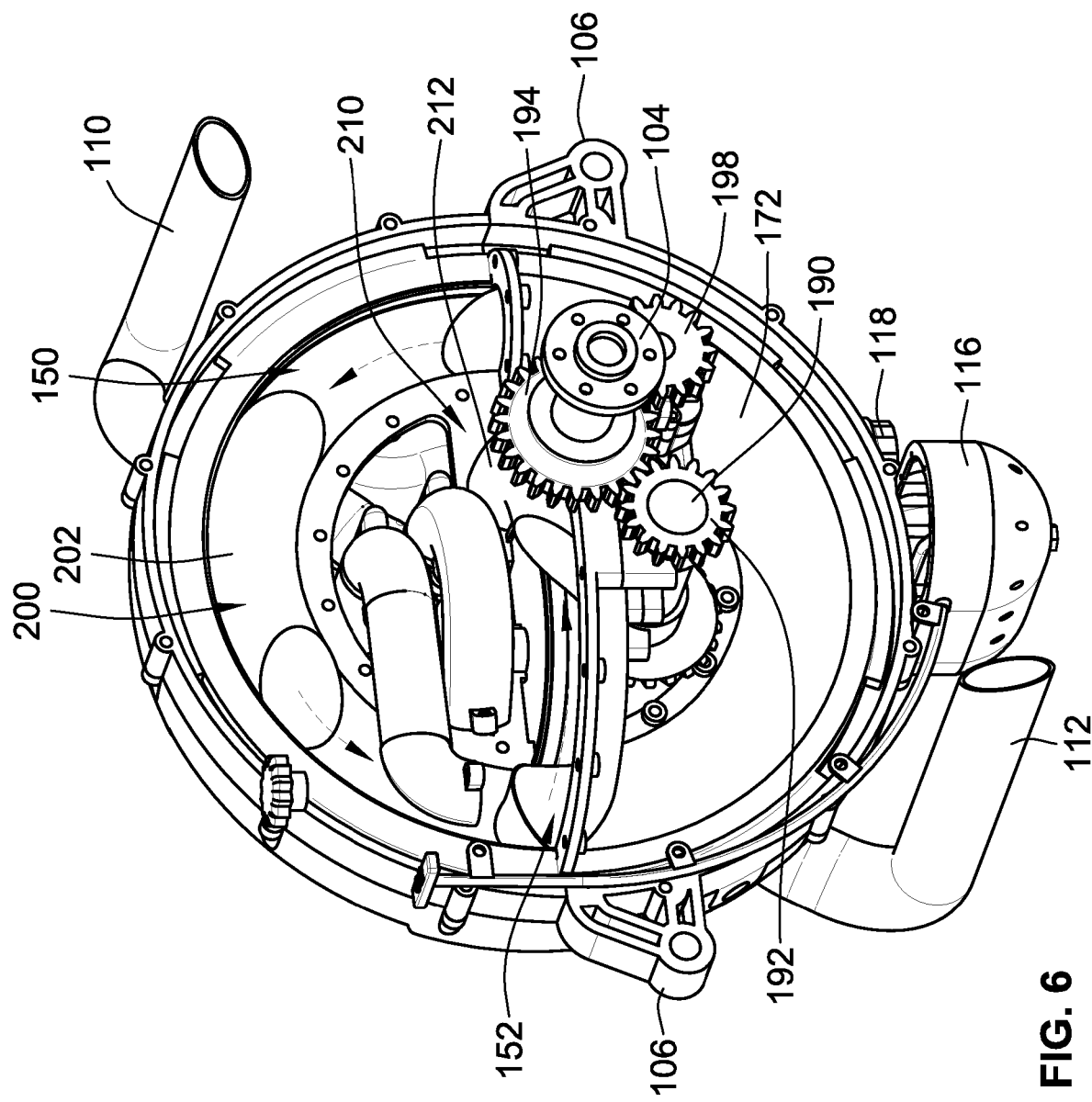
FIG. 6 is a perspective view of the toroidal engine of FIG. 1, with a cylinder covering removed to expose a first and second piston set.

Turning now to FIG. 6, second upper cylinder body 162 has been removed to expose the first and second piston sets 200, 210. First piston set 200 includes a plurality of pistons 202 which move along a first circular path 230 (see FIG. 8). Second piston set also includes a plurality of pistons 212 which move along a second circular path 240 (see FIG. 9). These piston sets 200, 210 rotate continuously and relative to one another about their respective circular paths 230, 240 in such manner that a piston 202 will pass between a space between adjacent pistons 212. This is timed by the above described drive train such that the pistons are in a "near miss" configuration as they rotate.

With regard to the combustion cycle, pistons 202 of first piston set 200 are power and exhaust pistons, while pistons 212 of second piston set 210 are intake and compression pistons. However, it is entirely plausible to reverse this such that first piston set 200 is responsible for intake and compression, while second piston set 210 is responsible for power and exhaust.

Turning now to FIG. 7, the same illustrates first and second piston sets 200, 210 in the context of portions of the drive train described above. Pistons 202 are connected to one another by way of a drive ring 220. Each piston 202 is fixed to the drive ring 220 such that the spacing between pistons 202, as well as their rotational orientation, is fixed. As a result, the face angle formed by the leading and trailing face of each piston 202 remains constant relative to the plane containing the circular path 230 which pistons 202 follow, and is approximately forty-five degrees. This forty-five degree angle allows the pistons to pass close by one another as is shown in FIG. 7.

Similarly, pistons 212 are connected to one another via a drive disc 222. Bevel gear 226 is coupled directly to drive disc 222, and is driven by bevel gear 224. Each piston 212 is fixed to the drive disc 222 such that the spacing between pistons 212, as well as their rotational orientation, is fixed. As a result, the face angle formed by the leading and trailing face of each piston 212 remains constant relative to the plane containing the circular path 240 which pistons 212 follow, and is approximately forty-five degrees. As stated above, this forty-five degree angle allows the pistons to pass close by one another as is shown in FIG. 7. As will also be detailed below, drive disc 222 may be formed by two separable disc halves to aid in the overall assembly of the system.

As may also be seen in FIG. 7, drive ring 220 includes intermittent spaces about is circumference. These spaces receive corresponding projections of drive cage 134 such that rotation of drive ring 220 results in rotation of drive cage 134. As stated above, however, it is also possible to fixedly attach drive cage 141 to drive ring 220. However, using the interfit configuration described herein, drive cage may be easily removed in a non-destructive manner.

Figure 8:
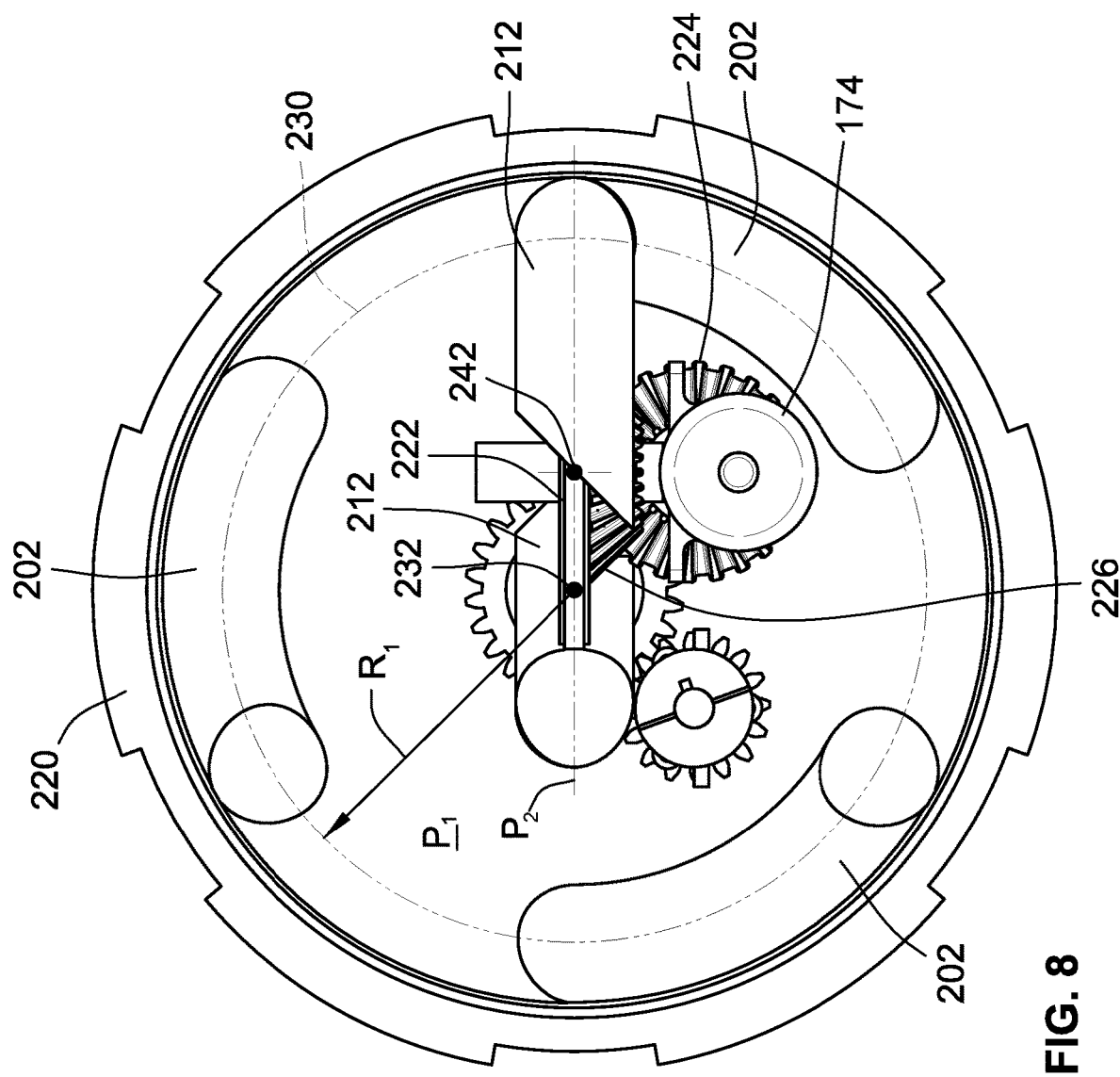
FIG. 8 is a front view of the piston sets and drive train.

Turning now to FIG. 8, the above introduced first circular path 230 is illustrated. This circular path is defined by the first toroidal cylinder 150. Each piston 202 assumes the same curvature as this path 230 as illustrated. First circular path 230 has a first radius $R_1$, and a center point 232. First circular path 230 and center point 232 lie within a first plane $P_1$ as shown.

Figure 9:
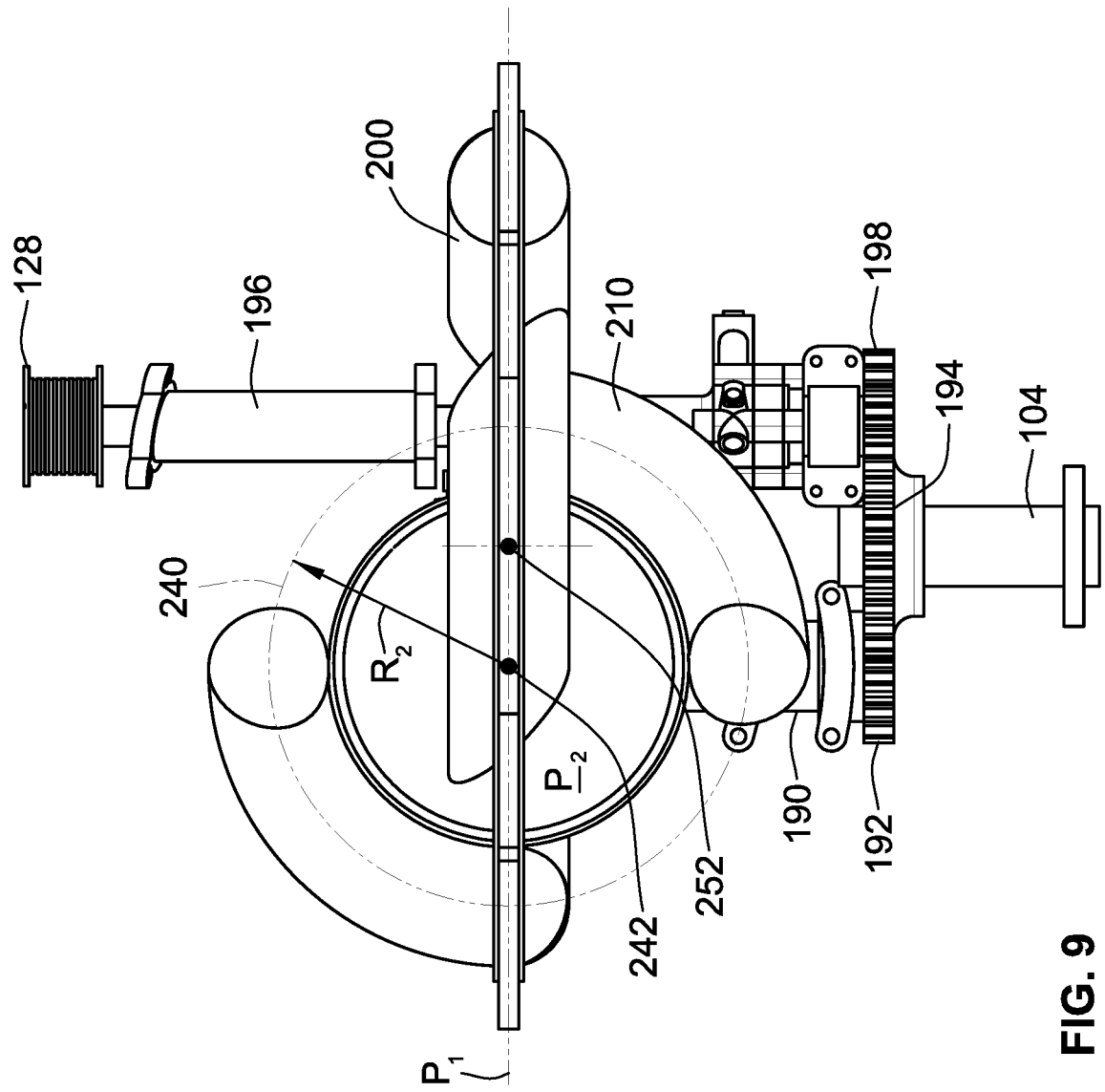
FIG. 9 is a top view of the drive train and piston sets.

In FIG. 9, the above introduced second circular path 240 is illustrated. This circular path is defined by the second toroidal cylinder 152. Each piston 212 assumes the same curvature as this path 240 as illustrated. Second circular path 240 has a first radius $R_2$, and a center point 242. Second circular path 240 and center point 242 lie within a second plane $P_2$ as shown, which is perpendicular to first plane $P_1$.

As may be seen from comparison between FIGS. 8 and 9, both piston sets 200, 210 share a common piston diameter, while the first radius $R_1$ is greater than the second radius $R_2$ by a specific, non-fractional amount, in this case 3:2. As may also be surmised from these views (as well as the remaining illustrations), the second toroidal cylinder 152 resides fully within the cylindrical space defined by the outer circumference of the first toroidal cylinder 150. The numerical differential of the first and second radii (in this case 3:2) is duplicated by the drive train to time the intersection of the piston sets. First and second piston sets 200, 210 include a respective piston 202, 212 quantity to match the above radii ratio and drive train ratio, hence the necessity that these ratios all be non-fractional or whole numbers. From this, it will be clear that while first piston set 200 is illustrated with three pistons 202 and second piston set 210 is illustrated with two pistons 212, the only constraint on the number of pistons is that the above whole number differential be maintained.

Figure 10:
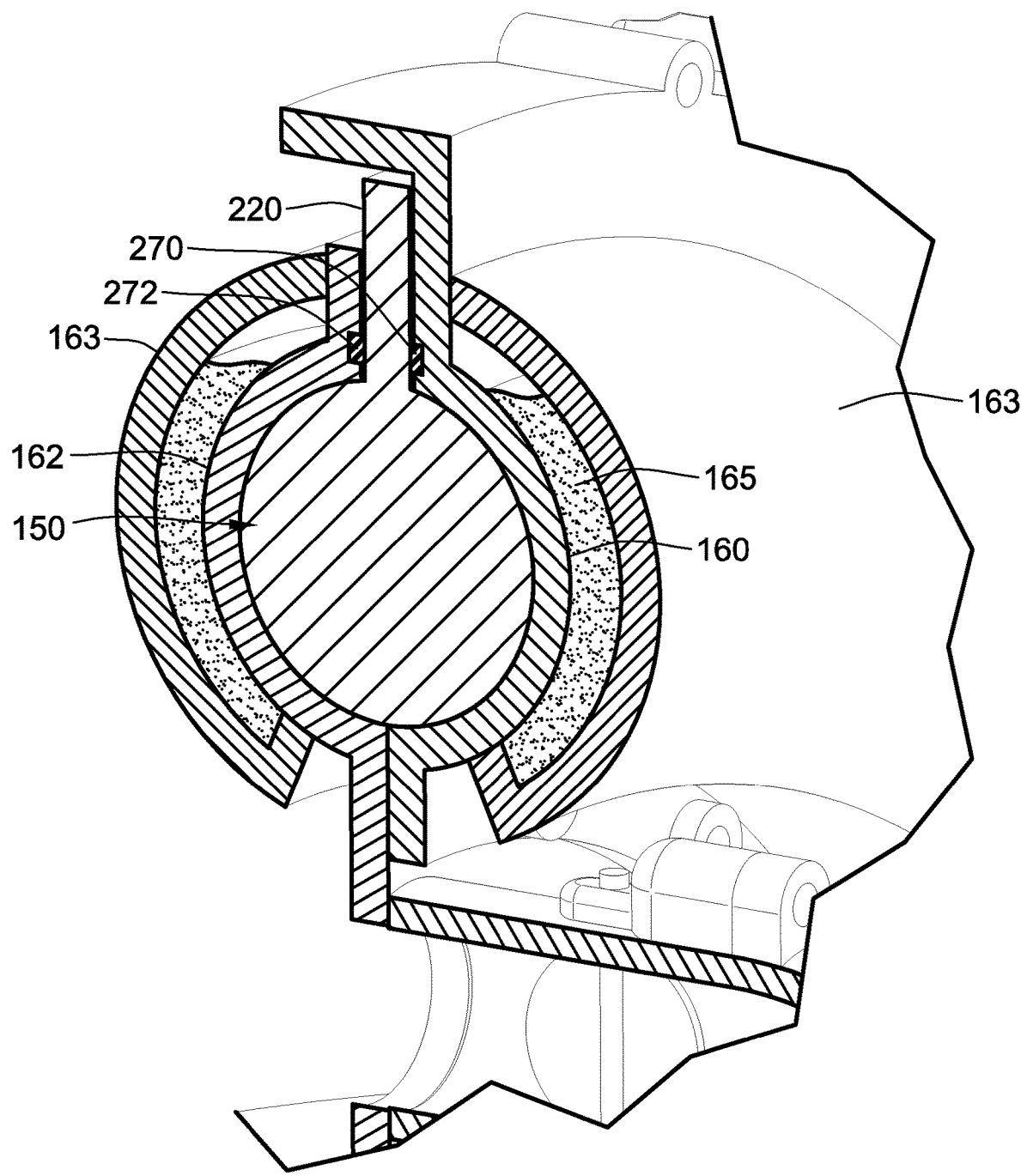
FIG. 10 is a perspective cross section of the toroidal engine of FIG. 1, exposing a pair of seal rings associated with one toroidal cylinder thereof.

Turning now to FIG. 10, first toroidal cylinder 150 employs a pair of seal rings 270, 272 which run the circumference of the joint formed between first and second upper cylinder bodies 160, 162, and first and second lower cylinder bodies 170, 172 (see FIGS. 4 & 5). This ensures adequate sealing and pressurization of first toroidal cylinder 150. Further, this allows for maintaining an adequate seal despite that drive ring 220 extends outwardly from first toroidal cylinder 150 and freely rotates. Also as shown in FIG. 10, a water jacket 163 may surround each cylinder formed by the first and second upper cylinder bodies 160, 162 and first and second lower cylinder bodies 170, 172. This water jacket 163 may, for non-limiting example, be welded to cylinder bodies 160, 162, 170, 172 so as to allow water or any other form of coolant 165 to flow around the exterior of cylinder bodies 160, 162, 170, 172 for purposes of cooling. It will readily appreciated that this water jacket 163 includes an inlet and an outlet to allow the water or coolant 165 to flow into and out of the jacket. Also, it will be readily appreciated that a water pump or other similar device can be associated with jacket 163 for pumping water or coolant 165 through jacket 163.

Figure 11:
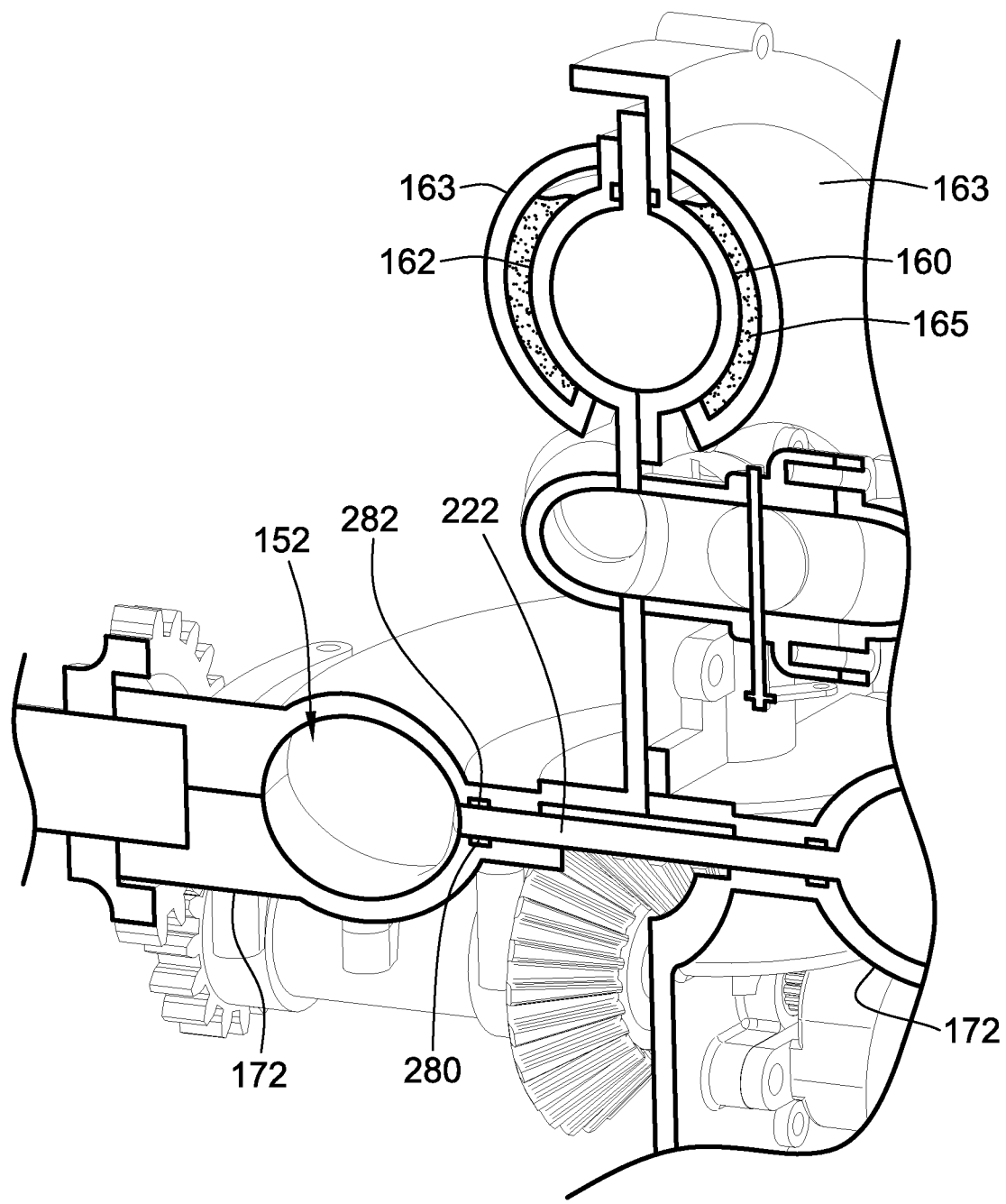
FIG. 11 is another perspective cross section of the toroidal engine of FIG. 1, exposing a pair of seal rings associated with another toroidal cylinder thereof.

The same holds true for second toroidal cylinder 152 as shown in FIG. 11. Specifically, another pair of seal rings 280, 282 run the circumference of the joint between first and second upper cylinder bodies 160, 162, and first and second lower cylinder bodies 170, 172. This ensures adequate sealing and pressurization of second toroidal cylinder 152. Further, this allows for maintaining an adequate seal despite that drive disc 222 extends inwardly from second toroidal cylinder 152 and freely rotates.

Further, adequate sealing and pressurization may also be achieved via use of piston rings (not shown) near the leading and trailing faces of each piston 202, 212, and which function in the same manner as conventional piston rings. These rings may be separate rings similar to conventional piston rings, or may be formed by forming ridges on the outer diameter of each piston. Still further, the leading face, trailing face, or both of the pistons of either piston set 200, 210 may also employ seals on their faces which aid in sealing relative to their respective toroidal cylinder.

Figure 12:
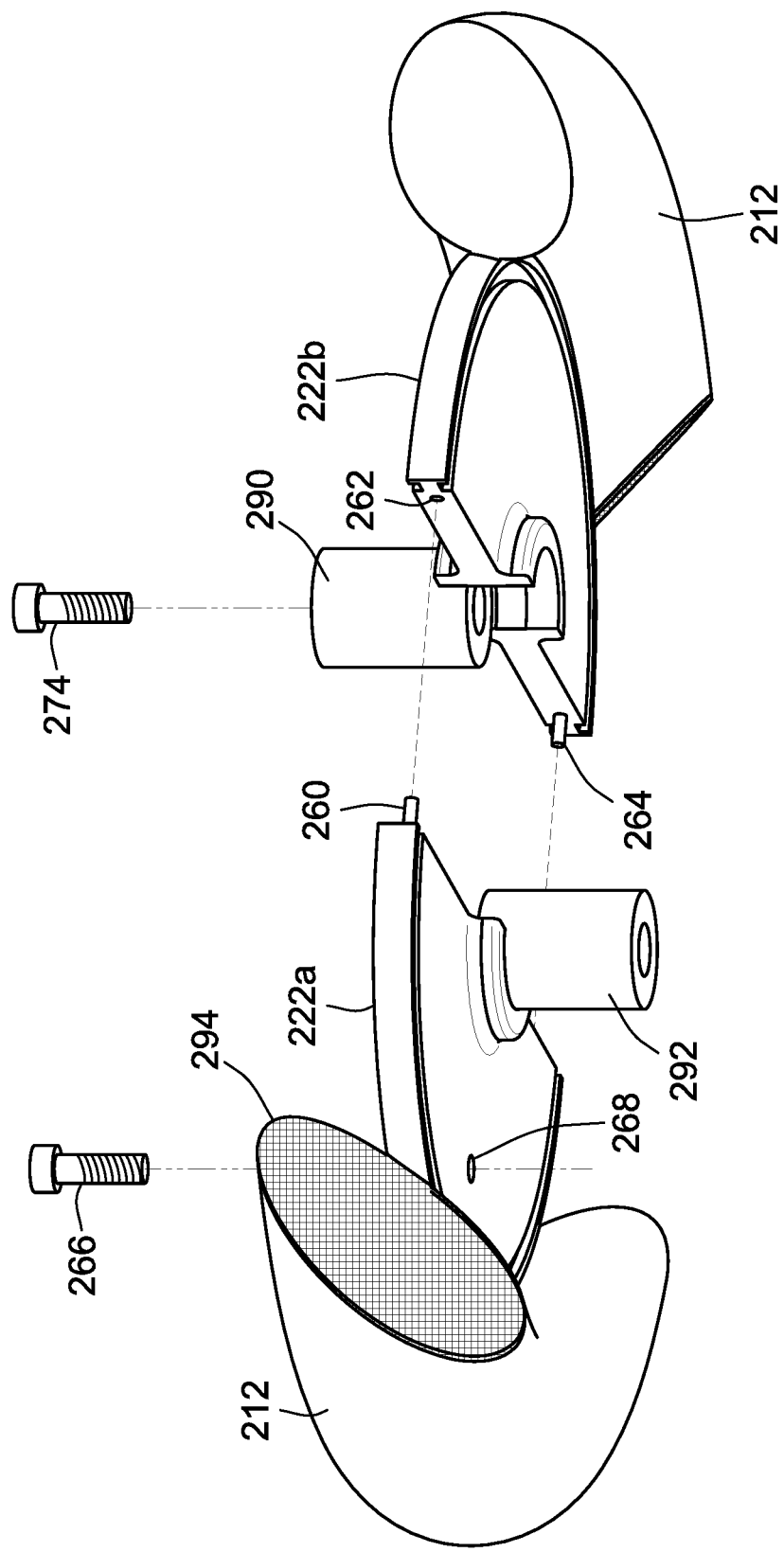
FIG. 12 is a perspective view of a drive disc of the engine of FIG. 1, formed as a two-part construction.

With reference now to FIG. 12, as mentioned above, drive disc 222 may be formed in two separable disc halves 222a, 222b as shown. This configuration allows for one disc half 222a to be assembled together with the first upper and lower cylinder bodies 160, 170, and then subsequently mated with the remainder of the assembly. The Applicant has discovered this feature greatly improves assembly of engine 100. Disc half 222a includes a locating pin 260 which is received in a corresponding aperture 262 of disc half 222b. Similarly, disc half 222b includes a locating pin 264 which is received in an aperture formed in disc half 222a and is symmetrically the same as aperture 262.

With this configuration, disc half 222b may first be assembled with upper and lower cylinder bodies 162, 172 such that its respective piston 212 is situated within the half torus formed thereby. Disc half 222a may then be assembled with upper and lower cylinder bodies 160, 170 such that its respective piston 212 is situated within this additional half torus likewise formed. Further, the position of disc half 222a may be locked in place temporarily by a locking pin 266 which is inserted through an aperture in the first upper cylinder body 160 and received through a corresponding locking bore 268 of disc half 222a, so that disc half 222a and the subsequently assembled drive disc 222 may not rotate during the final assembly of engine 100. This also ensures that piston set 210 is timed correctly relative to piston set 200.

Additionally, disc half 222b includes a journal halve 290 which aligns with another journal halve 292 formed on disc half 222a to form a complete shaft. A journal bolt 274 is used to join disc halves 222a, 222b together. This journal bolt 274 may be accessible from an exterior of first and second upper cylinder bodies 160, 162 via any convenient window or aperture. The aligned journal halves 290, 292 may then function in the same manner as is clear from the above, that is, they may receive bearings to support the rotation of drive disc 222, lower journal halve 292 may receive bevel gear 226, etc.

Also shown in FIG. 12 is a textured surface 294 on the leading face of the left-most piston 212. The Applicant has discovered that this textured face greatly increases turbulent flow across the piston face, thereby aiding in combustion. The Applicant has also found that this textured face signifi- cantly reduces the likelihood that combustion gases will flow away from this face during the combustion cycle (especially when opposing piston 202, 212 faces are directly aligned), which in turns aids in combustion as well as exhaust gas scavenging. This textured surface 294 may be included on the leading face, or the leading face and the trailing face, on any one of the pistons 202, 212, disclosed herein.

Having described the basic componentry and construction of engine 100, a description will now be provided of the various stages of the combustion cycle thereof. FIG. 13-19 illustrate these various stages, and each will be considered in turn in the following.

Figure 13:
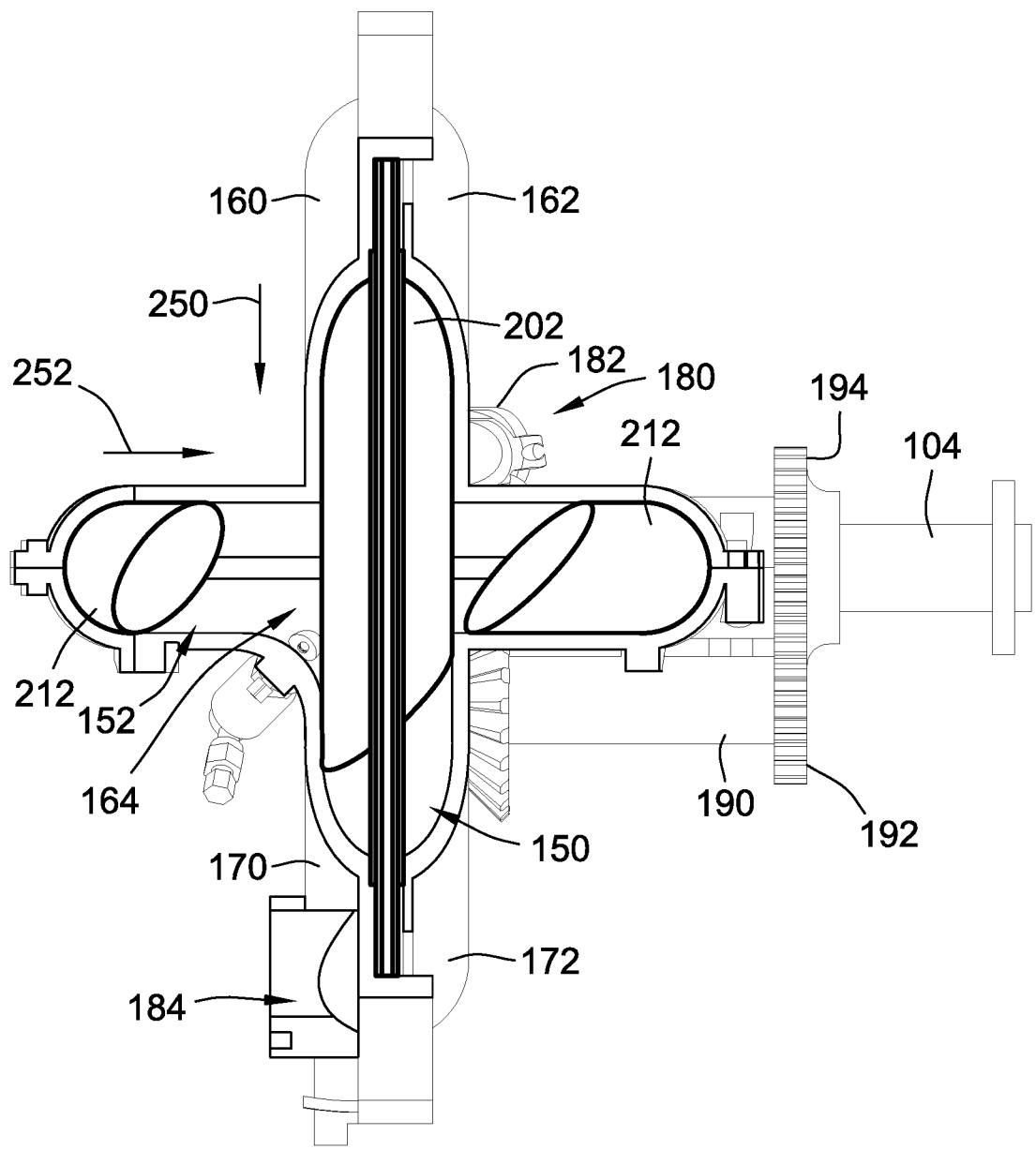
FIGS. 13-19 are side views of the toroidal engine cut away in the region of a combustion chamber to illustrate the intake, compression, power, and exhaust phases of the combustion cycle of the toroidal engine.

With reference to FIG. 13, the start of the compression cycle on the left side of second toroidal cylinder 152 is illustrated by the motion in direction 252 of the left-most horizontal piston 212. With the cylinder intersection and the combustion chamber 164 currently blocked by the introduction of one of the three vertical pistons 202 as it moves in direction 250, the air moved by the left horizontal piston 212 is thereby compressed into the combustion chamber blister.

Also shown in FIG. 13, the start of the intake on the right-most horizontal cylinder 212 is illustrated as it moves in direction 252. With the cylinder intersection currently blocked as stated above, a vacuum is created behind the receding piston face of this right-most piston 212. As the intake port 180 in the top right of the horizontal cylinder is currently open, a fresh intake charge will be admitted. These charges are carried around the second toroidal cylinder 152 in the spaces between the two pistons 212.

Also shown in FIG. 13, the second exhaust port 184 is shown to have been opened by the motion of the vertical piston 202 immediately preceding the intersection blocking piston. The exhaust pressure within the cylinder is thereby reduced. The first exhaust port 182 is closed by piston 202 pending arrival of the next captive exhaust charge which will be of reduced pressure due to the action of the second exhaust port 184.

Figure 14:
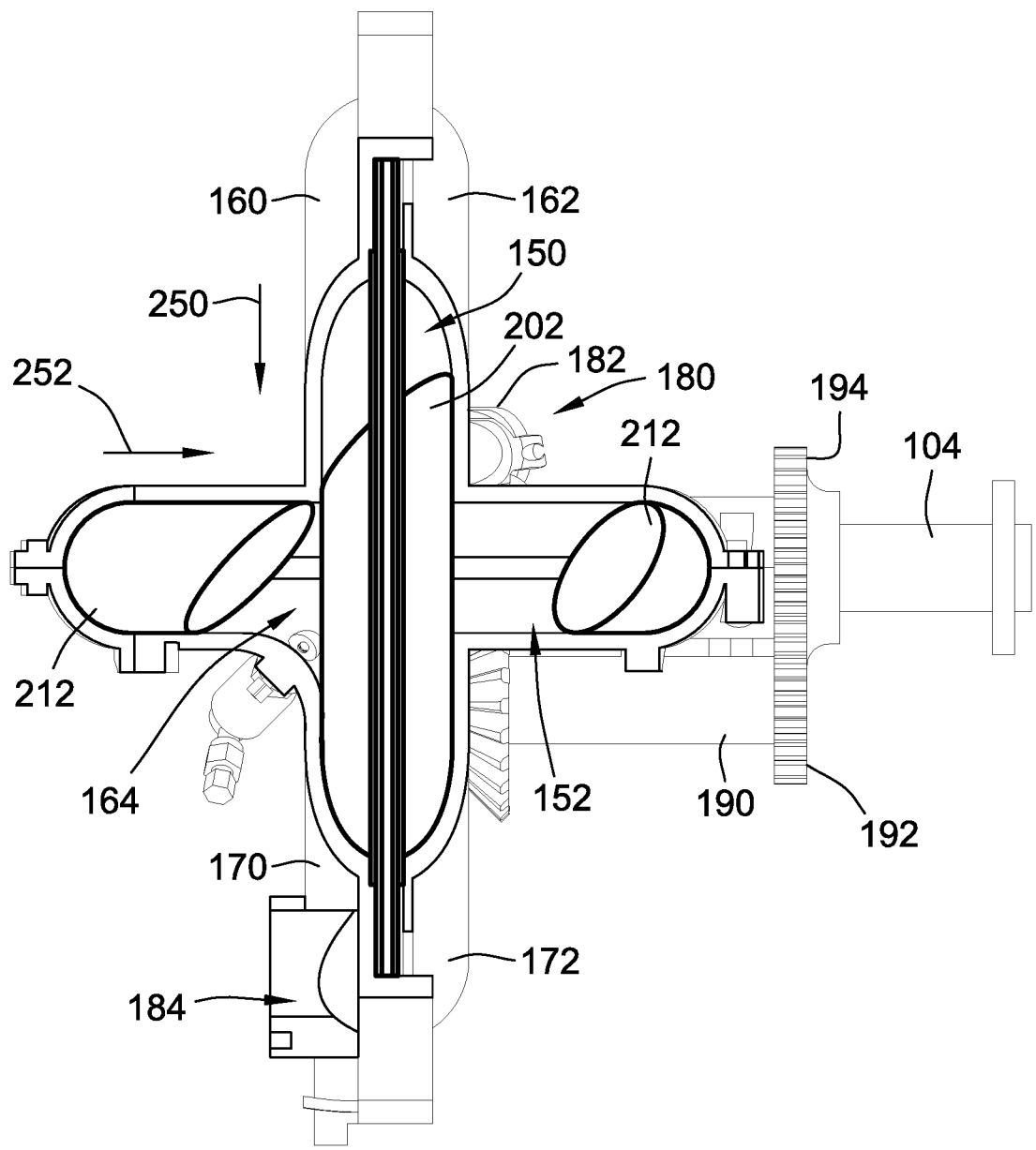

Turning now to FIG. 14 the left horizontal piston 212 is illustrated in mid-compression cycle, and hence the cylinder volume between the leading face of piston 212 and the side wall of piston 202 has been greatly reduced, forcing the intake charge further into the combustion chamber 164 blister region. The right horizontal piston 212 is illustrated in mid-intake cycle, and hence the cylinder volume there has been greatly increased by the forward motion of the right hand horizontal piston 212 drawing the next intake charge further into the horizontal cylinder. The second exhaust port 184 closure has also begun. This closure is actuated by the downward motion of the vertical piston 202 as it begins to leave the combustion chamber 164, with its trailing face aligned with the leading face of the left hand horizontal piston 212. Also shown in FIG. 14, first exhaust port 182 remains closed, the passage of the trailing face of the downward moving vertical piston 202 will soon begin opening this port 182.

Figure 15:
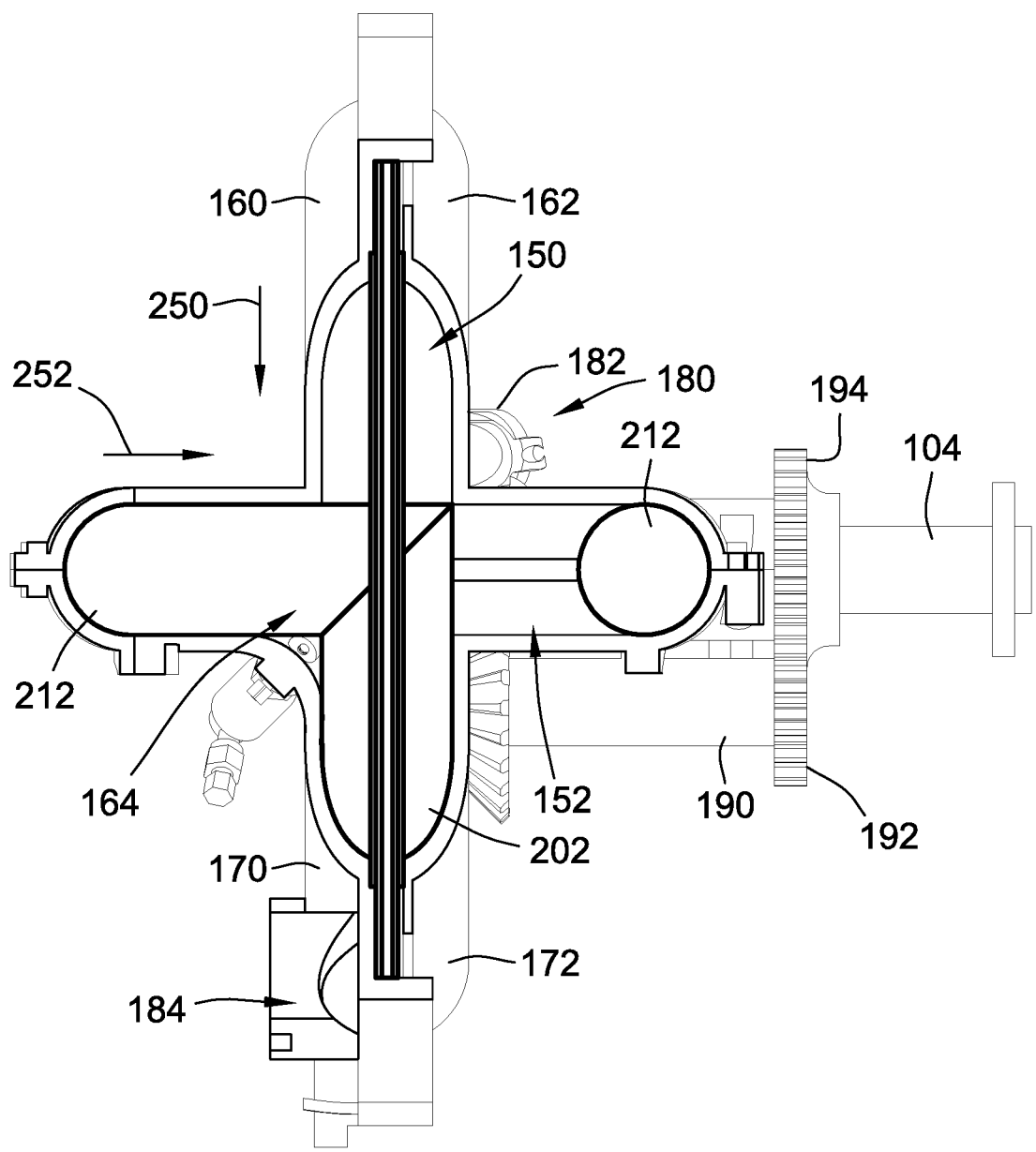

Turning now to FIG. 15, the left horizontal piston 212 is illustrated at maximum compression, and hence cylinder volume has been reduced to its minimum by the forward motion of the left hand horizontal piston 212, forcing the intake charge completely into the combustion chamber 164. It is at this point or earlier that the fuel is injected into the combustion chamber 164. It is also at this point or earlier that the spark plug 166 (see FIG. 4) is fired to ignite the fuel air mixture in the case of a gasoline or similar type of engine. It is also at this point or earlier that the spontaneous combustion of a diesel type engine can be expected to occur, the spark plug being replaced by a glow plug for cold starting in the case of a diesel design.

The left hand horizontal piston 212 continues its motion toward the right hand side of the second toroidal cylinder 152, and hence moves toward an intake port 180 blocking position which will soon end the previous intake cycle of the right hand piston. The downward motion of the vertical piston 202 closes the second exhaust port 184 by way of its blockage. The downward motion of the vertical piston 202, has also just opened the first exhaust port 182. Transition from vertical to horizontal piston blockage of the cylinder intersection is now at the half way point.

Figure 16:
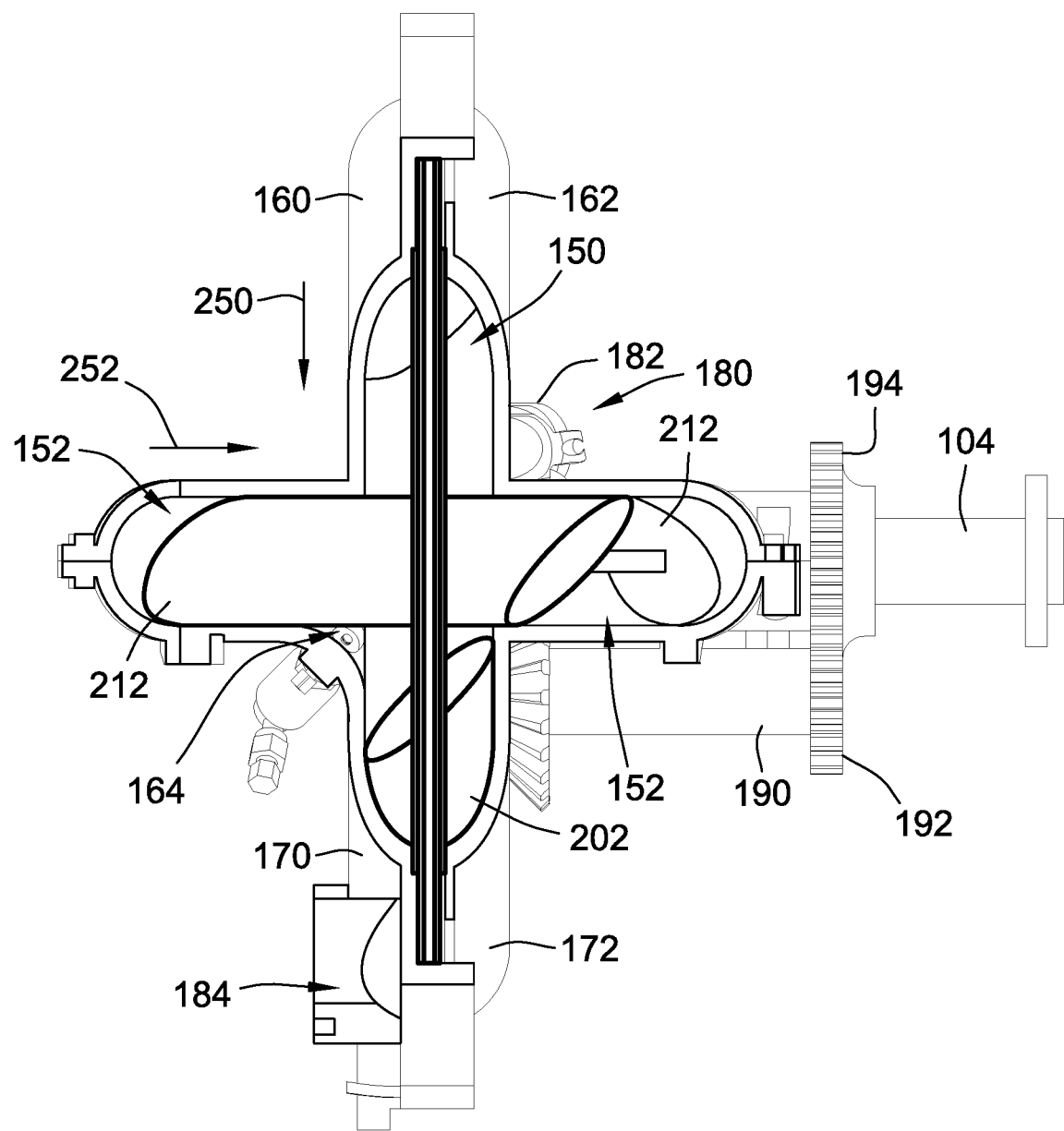

With reference to FIG. 16, a power cycle is illustrated. In the example shown there will be three power cycles per revolution of the output shaft 104, as there are three pistons 202 within the first toroidal cylinder 150. The transition from vertical to horizontal piston blockage of the cylinder intersection is now complete. The left horizontal piston 212 now blocks the cylinder intersection and can be considered to have transitioned into a foreground piston.

Fuel has already been injected into the combustion chamber and the spark plug 166 (see FIG. 4) has fired to ignite the fuel air mixture in the case of a gasoline or similar type of engine. Also at this point spontaneous combustion of a diesel type engine has already occurred. The vertical piston 202 continues downward in direction 250 during this power stroke, its trailing edge withholding the combustion pressure. Vertical cylinder volume in the first toroidal cylinder 150 below foreground piston 212 is now increasing in the area inclusive of the combustion chamber 164.

The foreground horizontal piston 212 has closed the intake port 180 trapping a fresh intake charge between its leading face and the trailing face of the preceding piston 212. Also, the second exhaust port 184 remains closed. As a result the increased pressure at the trailing edge of piston 202 is exerted against this face, producing a power output. The first exhaust port 182 remains open, with the leading face of the oncoming piston 212 in the process of expelling all exhaust remaining after the significant exhaust pressure reduction of the second exhaust port 184 which occurred earlier.

Figure 17:
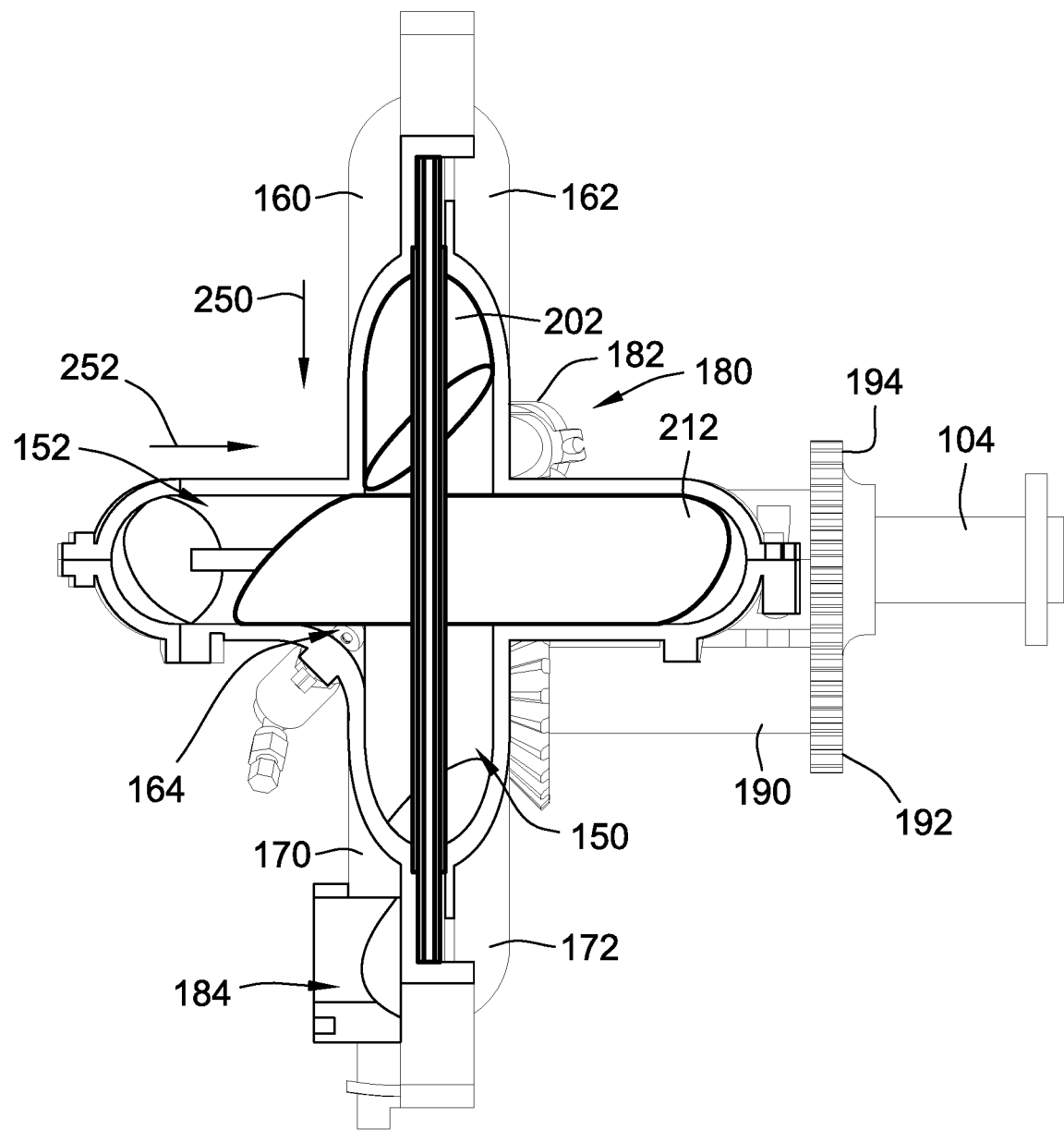

Turning now to FIG. 17, a fresh intake charge is being transported within the left section of the second toroidal cylinder 152. This charge is contained between the leading face of the background piston 212 and the trailing face of the foreground piston 212. This trailing face of the foreground piston 212 is now aligned with the leading face of the next vertical piston 202 in preparation of another intersection blockage transition as this second vertical piston 202 descends in direction 250.

The foreground piston 212 has also closed the intake port 180 on the right side of the horizontal cylinder. The second exhaust port 184 remains closed but will soon re-open when the trailing face of the vertical piston 202 passes. The leading face of the second vertical piston 202 works in conjunction with the intersection blockage to expel the last of the exhaust from a previous combustion cycle via the first exhaust port 182. This particular exhaust cycle will conclude with the blockage of the first exhaust port 182.

Figure 18:
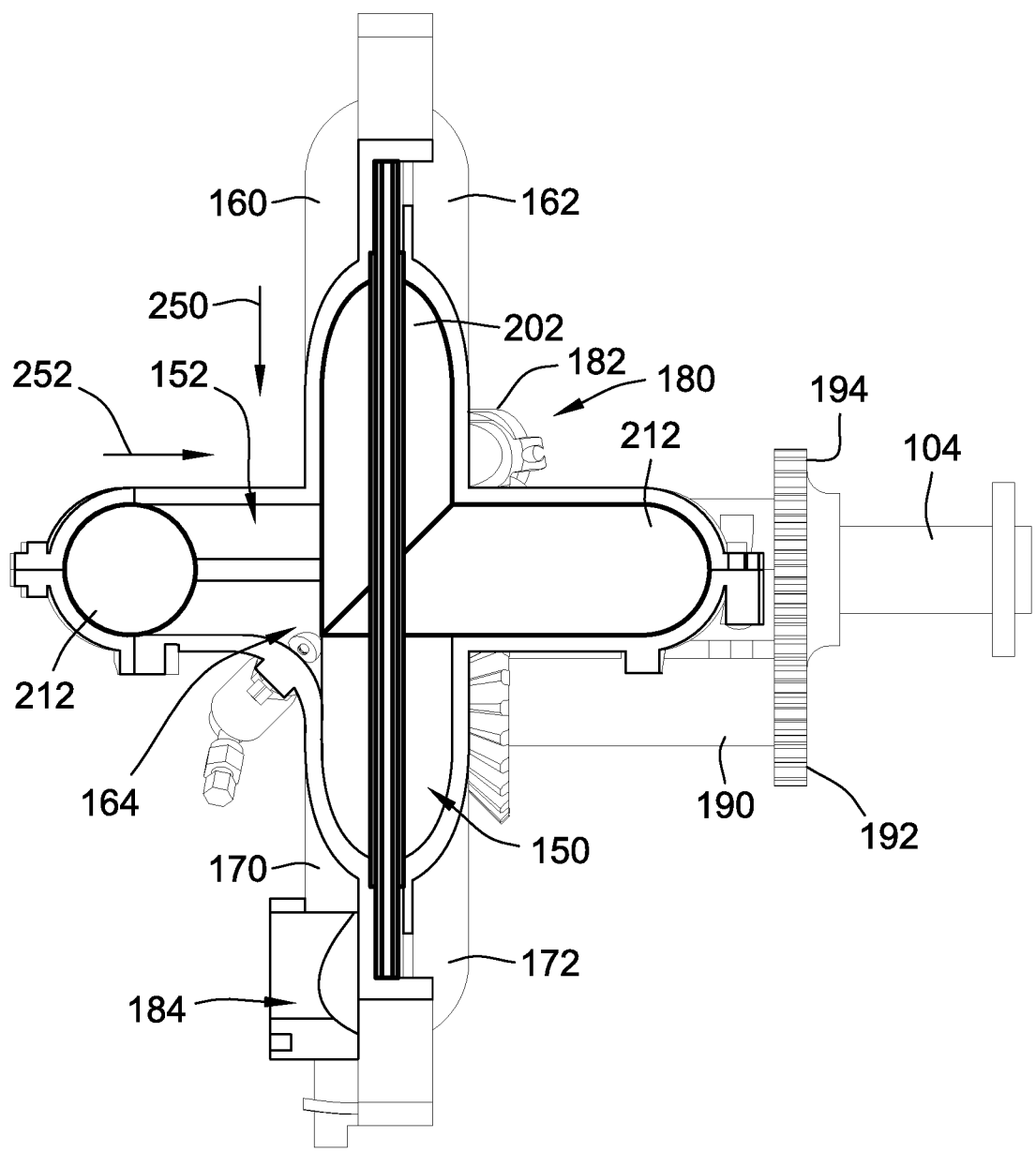

With reference to FIG. 18, a portion of the oncoming fresh intake charge is used to perform an exhaust scavenging operation. The leading face of the background horizontal piston 212 is forcing air across the combustion chamber blister from the left side of the second toroidal cylinder 152 to the lower section of the first toroidal cylinder 150 and towards the second exhaust port 184. The intake 180 remains closed on the right of second toroidal cylinder 152, but will soon re-open due to the motion of the foreground horizontal piston 212. The second exhaust port 184 has also just been opened by the trailing face of the previous vertical piston 202 allowing the exhaust gas scavenging operation to succeed. Further, first exhaust port 182 is now closed. Transition from horizontal piston 212 to vertical piston 202 blockage of the cylinder intersection is now at the half way point.

Figure 19:
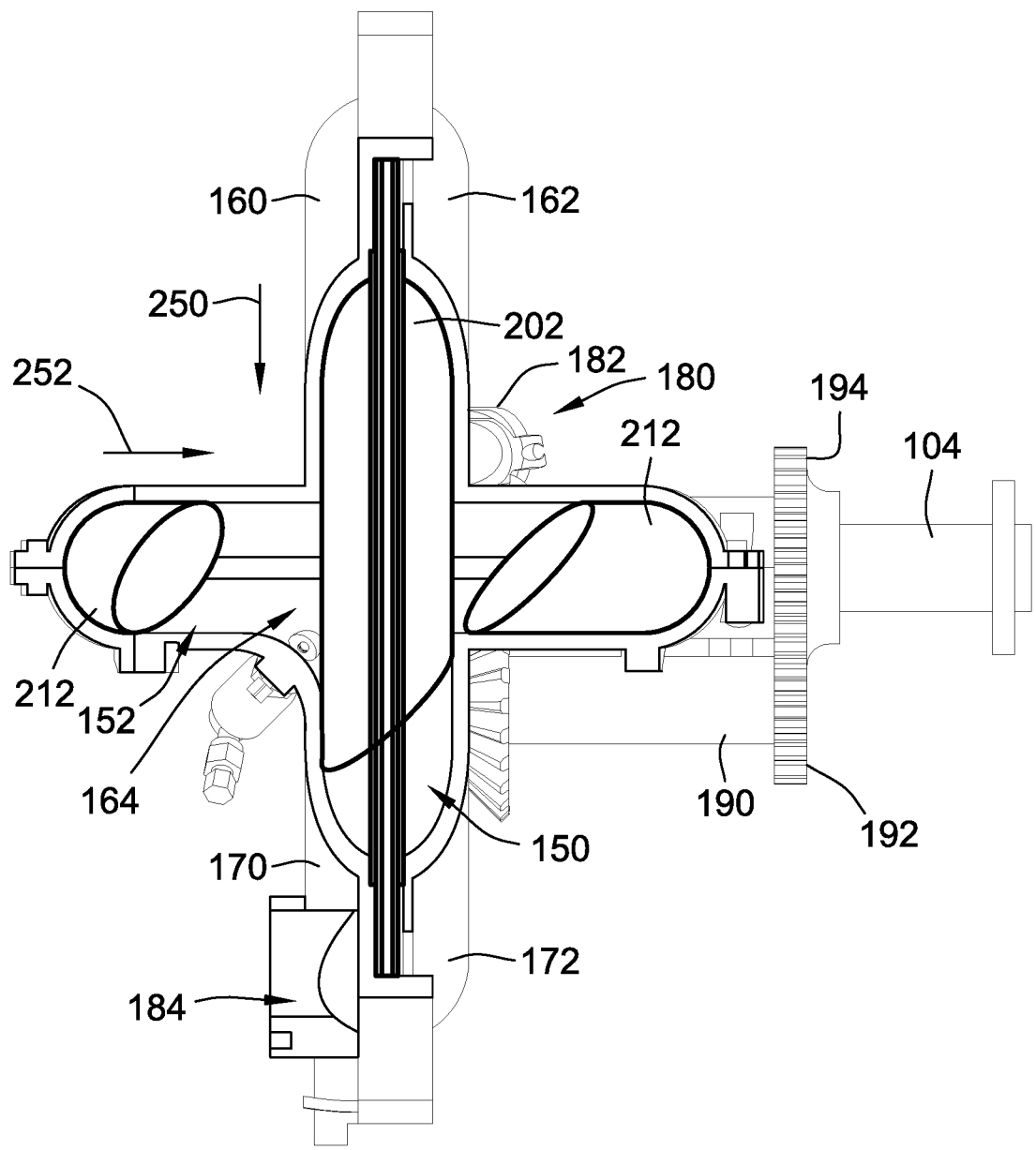

With reference to FIG. 19, combustion cycle is now at the same configuration as that shown in FIG. 13. The horizontal pistons 212 have made one-half of a complete revolution. The vertical pistons 202 have made one-third of a revolution. In other words, the first combustion cycle is complete, and the second is ready to begin.

Figure 20:
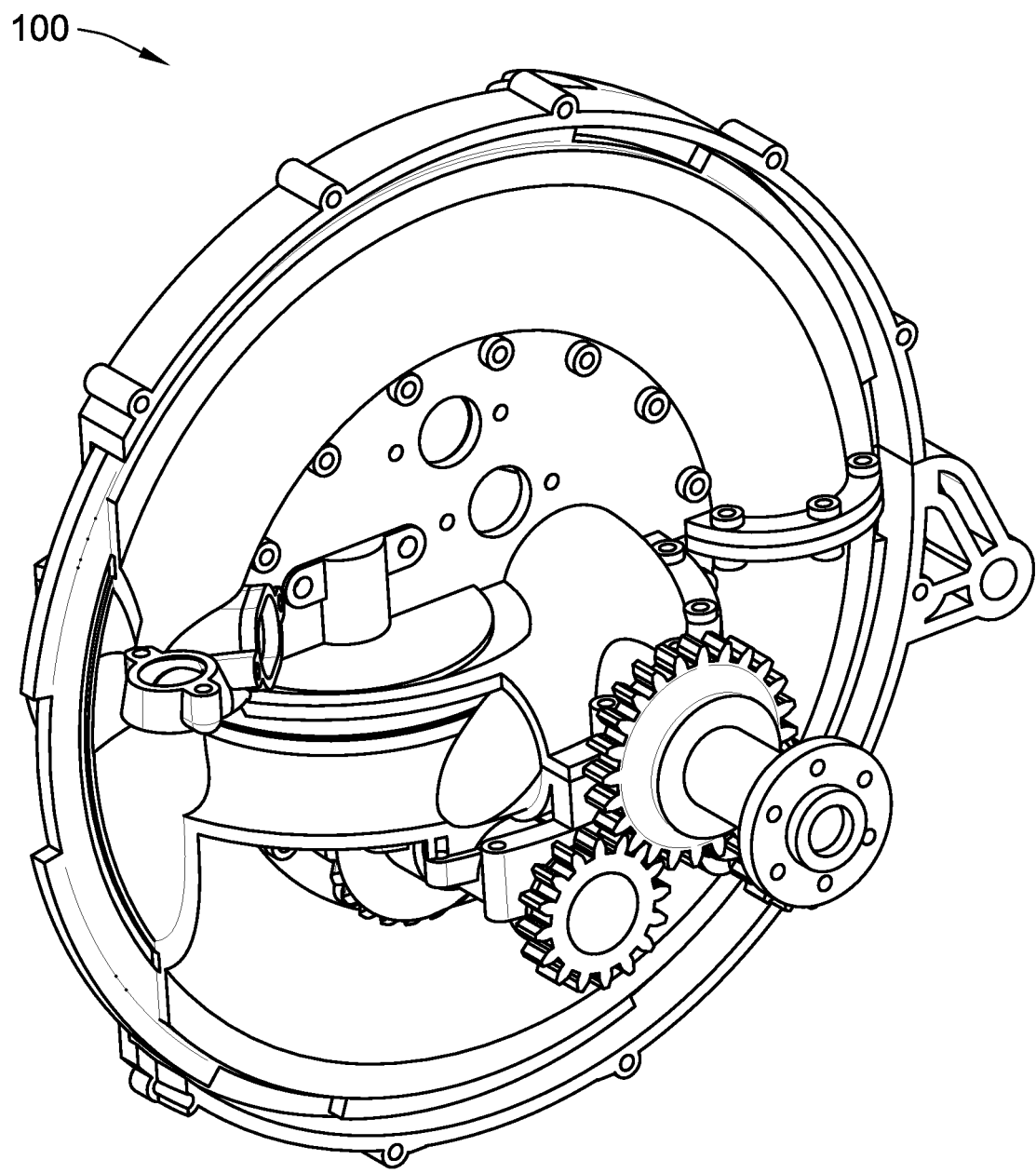
FIGS. 20-22 are perspective views illustrating the section cut of FIGS. 13-19.
Figure 21:
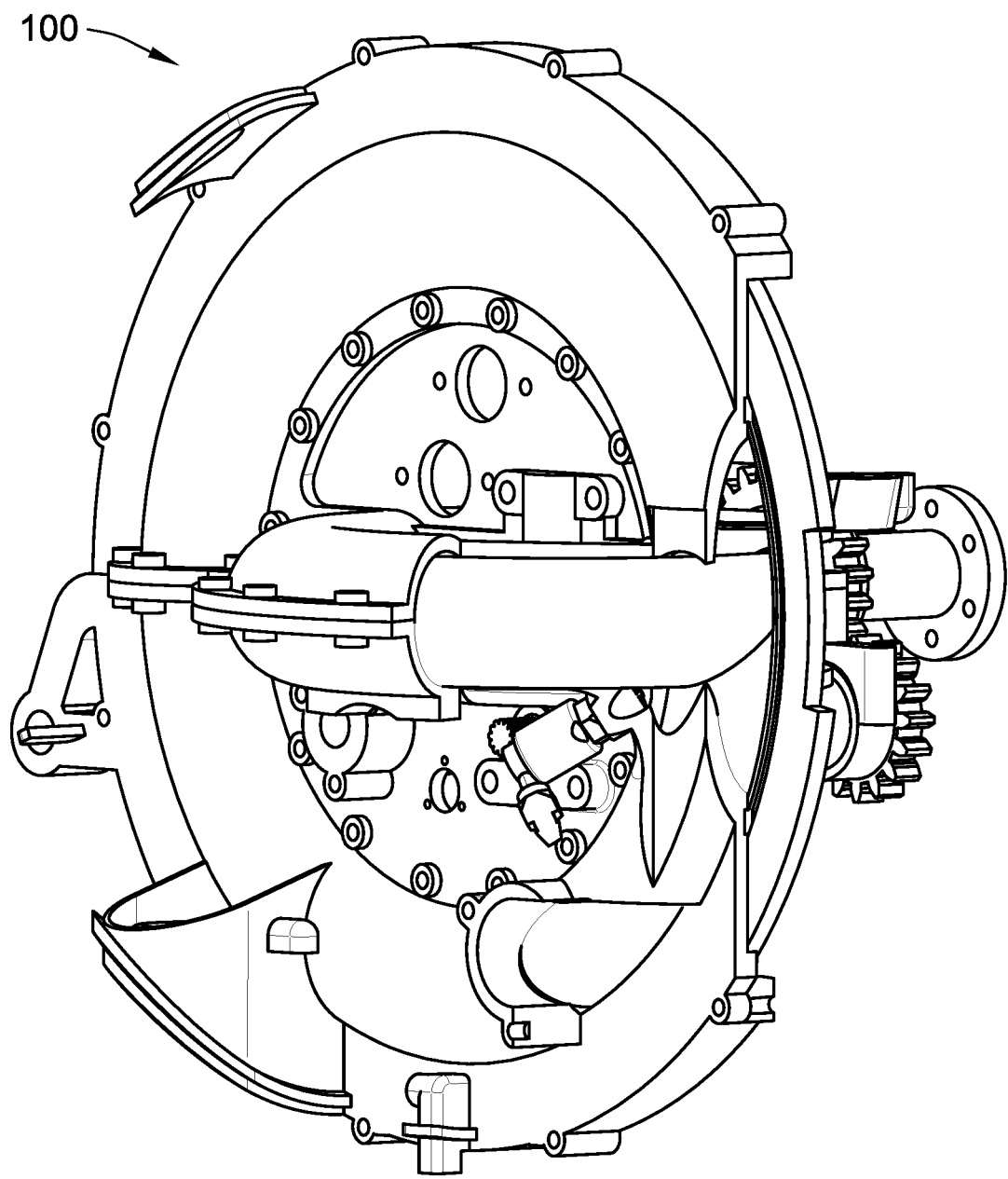
Figure 22:
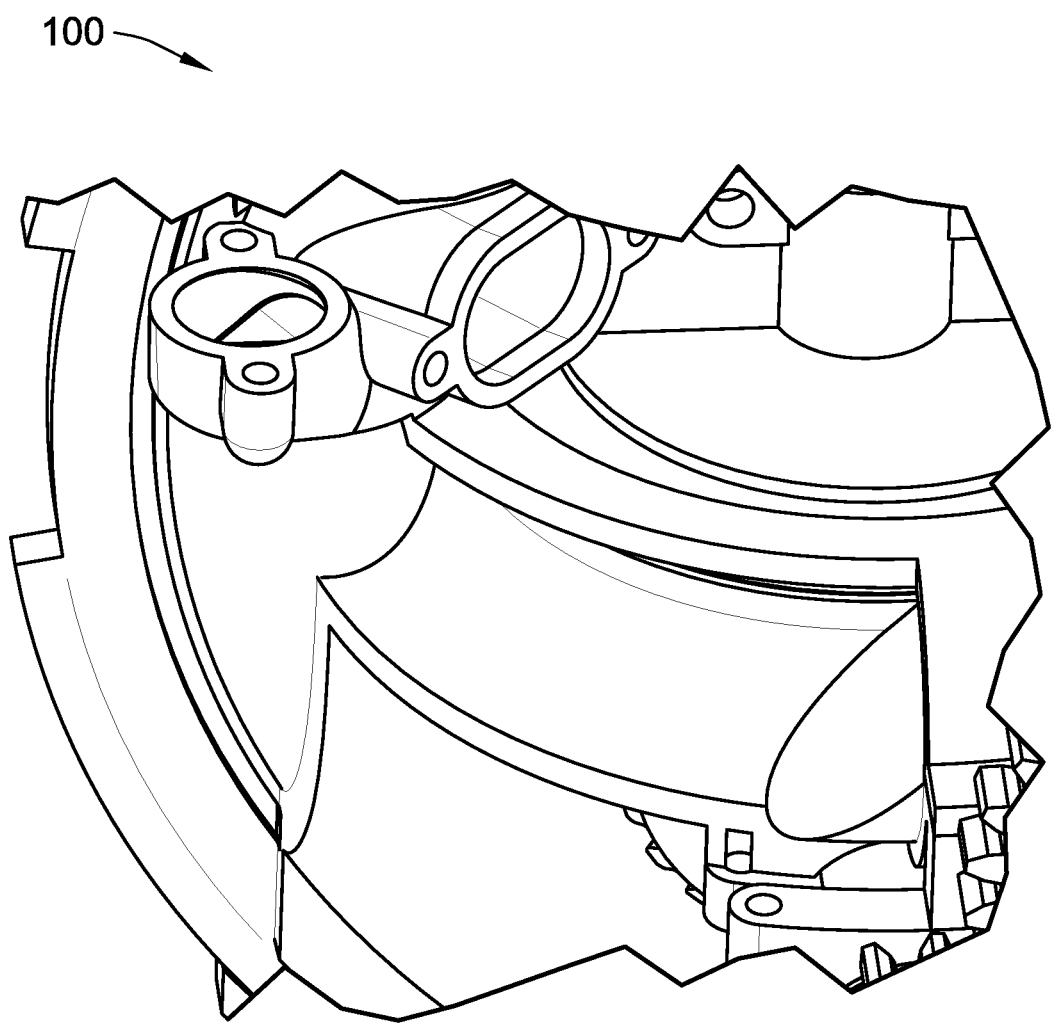

FIGS. 20-22 are perspective views illustrating the section cut of FIGS. 13-19.

As described herein, engine 100 presents a new and inventive toroidal design which on the one hand presents a small footprint due to the efficient arrangement of its toroidal cylinders and their respective single intersection, yet on the other hand provides a desirable power output. Further, engine 100 may be readily implemented in many existing systems given the convenience of its mounts, output shaft arrangement, and accessory driving capabilities.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A toroidal combustion engine, comprising:
a first toroidal cylinder housing a first piston set, the first piston set rotatable within said first toroidal cylinder;
a second toroidal cylinder housing a second piston set, the second piston set rotatable within said second toroidal cylinder;
a drive train connecting the first piston set to the second piston set such that rotation of the first piston set results in rotation of the second piston set, the drive train further comprising an output shaft for providing a power output from the toroidal combustion engine; and
wherein the first and second toroidal cylinders intersect at a single intersection to define a combustion chamber of the toroidal engine; and
wherein a first circular path of the first piston set has a first mean radius and wherein a second circular path of the second piston set has a second mean radius, wherein the first mean radius is greater than the second mean radius.

2. The toroidal engine of claim 1, further comprising a first pair of seal rings sealing the first piston set within the first toroidal cylinder and a second pair of seal rings sealing the second piston set within the second toroidal cylinder.

3. The toroidal engine of claim 1, further comprising a lubrication arrangement for conveying lubrication to one or more lubrication points of the toroidal engine, said lubrication arrangement including an oil pan, an oil pump for circulating oil from the oil pan and back to the oil pan, and an oil filter for filtering oil circulating in said lubrication arrangement.

4. The toroidal combustion engine of claim 1, wherein an intake port and first exhaust port are in fluid communication with the combustion chamber, and further comprising a throttle body in communication with the intake port to control the flow of intake air through the intake port.

5. The toroidal combustion engine of claim 4, further comprising one of a spark plug or a glow plug, and a fuel injector, each in communication with the combustion chamber.

6. The toroidal combustion engine of claim 5, further comprising a second exhaust port, the second exhaust port in fluid communication with the first toroidal cylinder.

7. The toroidal combustion engine of claim 1, wherein the first piston set includes a first plurality of pistons and the second piston set includes a second plurality of pistons, wherein the first plurality of pistons is greater in number than the second plurality of pistons, wherein the second plurality of pistons are commonly mounted to a drive disc, and wherein the drive disc comprises two matable disc halves.

8. The toroidal combustion engine of claim 7, wherein a ratio of the first radius to the second radius is equal to a ratio of a total number of the first plurality of pistons to a total number of the second plurality of pistons.

9. The toroidal combustion engine of claim 7, wherein the first plurality of pistons is rotatable about the first circular path lying in a first plane, and wherein the second plurality of pistons is rotatable about the second circular path lying in a second plane perpendicular to the first plane.

10. The toroidal combustion engine of claim 9, wherein each one of the first plurality of pistons includes a leading face and a trailing face, wherein the leading face and the trailing face of each one of the first plurality of pistons intersects the first plane at a forty-five degree angle, and wherein each one of the second plurality of pistons includes a leading face and a trailing face, wherein the leading face and the trailing face of each one of the second plurality of pistons intersects the second plane at a forty-five degree angle, wherein at least one of the leading face and the trailing face of at least one of the first plurality of pistons or the second plurality of pistons includes a textured surface.

11. The toroidal combustion engine of claim 9, wherein a center of the first circular path and a center of the second circular path each lie within both the first plane and the second plane.

12. A toroidal combustion engine, comprising:
a first toroidal cylinder housing a first piston set, the first piston set rotatable about a first circular path, wherein said first circular path lies within a first plane;
a second toroidal cylinder housing a second piston set, the second piston set rotatable about a second circular path, wherein said second circular path lies within a second plane, wherein said first and second planes are arranged such that they are perpendicular to one another;
a combustion chamber defined between the first toroidal cylinder and the second toroidal cylinder;
a drive train connecting the first piston set to the second piston set such that rotation of the first piston set results in rotation of the second piston set;
wherein a center of the first circular path and a center of the second circular path each lie within both the first plane and the second plane;
wherein the first toroidal cylinder and second toroidal cylinder are formed via connection of first and second upper cylinder bodies and first and second lower cylinder bodies; and
wherein the first piston set includes a first plurality of pistons, said first plurality of pistons commonly connected to a drive ring, said drive ring including an outwardly projecting flange, wherein a first pair of seal rings are arranged between the first and second upper cylinder bodies and the first and second lower cylinder bodies such that the one of the first pair of seal rings is interposed between the first upper cylinder body and the first lower cylinder body and a first side of the flange, and the other one of the first pair of seal rings is interposed between the second upper cylinder body and the second lower cylinder body and a second side of the flange.

13. The toroidal engine of claim 12, further comprising an electric starter connected to a drive shaft for providing an input torque to the drive shaft.

14. The toroidal combustion engine of claim 12, wherein the first and second toroidal cylinders have a single intersection which defines the combustion chamber, and wherein an intake port and first exhaust port are in fluid communication with the combustion chamber, and further comprising a throttle body in communication with the intake port to control the flow of intake air through the intake port.

15. The toroidal combustion engine of claim 14, further comprising a second exhaust port, the second exhaust port in fluid communication with the first toroidal cylinder, wherein the first and second exhaust port are opened and closed in an alternating configuration by the first piston set such that when the first exhaust port is open, the second exhaust port is closed and when the second exhaust port is open the first exhaust port is closed.

16. The toroidal combustion engine of claim 12, wherein the second piston set includes a second plurality of pistons, said second plurality of pistons commonly connected to a drive disc, wherein a second pair of seal rings are arranged between the first and second upper cylinder bodies and the first and second lower cylinder bodies such that one of the second pair of seal rings is interposed between the first upper body and the second upper body and a first side of the drive disc, and the other one of the second pair of seal rings is interposed between the first lower body and the second lower body and a second side of the drive disc.

17. The toroidal combustion engine of claim 16, wherein the first plurality of pistons is rotatable about the first circular path lying in the first plane, and wherein the second plurality of pistons is rotatable about the second circular path lying in the second plane perpendicular to the first plane.

18. The toroidal combustion engine of claim 16, wherein each one of the first plurality of pistons includes a leading face and a trailing face, wherein the leading face and the trailing face of each one of the first plurality of pistons intersects the first plane at a forty-five degree angle, and wherein each one of the second plurality of pistons includes a leading face and a trailing face, wherein the leading face and the trailing face of each one of the second plurality of pistons intersects the second plane at a forty-five degree angle.

19. The toroidal engine of claim 12, further comprising a lubrication arrangement for conveying lubrication to one or more lubrication points of the toroidal engine, said lubrication arrangement including an oil pan, an oil pump for circulating oil from the oil pan and back to the oil pan, and an oil filter for filtering oil circulating in said lubrication arrangement.

20. The toroidal engine of claim 19, wherein the drive train further comprises a drive cage connecting the first piston set to an output shaft of the drive train such that rotation of the first piston set results in rotation of the output shaft, the output shaft connected to a drive shaft of the drive train such that rotation of the output shaft results in rotation of the drive shaft, the drive shaft connected to the second piston set such that rotation of the drive shaft results in rotation of the second piston set.

21. The toroidal engine of claim 20, wherein the drive train further comprises an accessory shaft connected to the output shaft, the oil pump connected to the accessory shaft such that rotation of the output shaft results in rotation of the accessory shaft to drive the oil pump.

22. A toroidal combustion engine, comprising:
a first toroidal cylinder housing a first piston set, the first piston set rotatable within said first toroidal cylinder;
a second toroidal cylinder housing a second piston set, the second piston set rotatable within said second toroidal cylinder;
a combustion chamber defined by the first and second toroidal cylinders; and
a drive train connecting the first piston set to the second piston set such that rotation of the first piston set results in rotation of the second piston set, the drive train comprising a drive cage connecting the first piston set to an output shaft of the drive train such that rotation of the first piston set results in rotation of the output shaft, the output shaft connected to a drive shaft of the drive train such that rotation of the output shaft results in rotation of the drive shaft, the drive shaft connected to the second piston set such that rotation of the drive shaft results in rotation of the second piston set
wherein the first piston set is rotatable about a first circular path in a first plane, and wherein the second piston set is rotatable about a second circular path in a second plane, wherein the first circular path has a first mean radius and wherein the second circular path has a second mean radius, wherein the first mean radius is greater than the second mean radius.

23. The toroidal combustion engine of claim 22, wherein an intake port and first exhaust port are in fluid communication with the combustion chamber, and further comprising a throttle body in communication with the intake port to control the flow of intake air through the intake port.

24. The toroidal engine of claim 22, further comprising a first pair of seal rings sealing the first piston set within the first toroidal cylinder and a second pair of seal rings sealing the second piston set within the second toroidal cylinder.

25. The toroidal combustion engine of claim 22, wherein the first piston set includes a first plurality of pistons and the second piston set includes a second plurality of pistons, wherein the first plurality of pistons is greater in number than the second plurality of pistons.

26. The toroidal combustion engine of claim 25, wherein each one of the first plurality of pistons includes a leading face and a trailing face, wherein the leading face and the trailing face of each one of the first plurality of pistons intersects the first plane at a forty-five degree angle, and wherein each one of the second plurality of pistons includes a leading face and a trailing face, wherein the leading face and the trailing face of each one of the second plurality of pistons intersects the second plane at a forty-five degree angle.

* * * * *